US011374792B2

(12) United States Patent
Kasso et al.

(10) Patent No.: US 11,374,792 B2
(45) Date of Patent: Jun. 28, 2022

(54) TECHNIQUES FOR UTILIZING MULTIPLE NETWORK INTERFACES FOR A CLOUD SHELL

(71) Applicant: Oracle International Corporation, Redwood Shores, CA (US)

(72) Inventors: Christopher S. Kasso, Los Altos, CA (US); Peter Grant Gavares, Austin, TX (US); John Wells, Scotch Plains, NJ (US); Amy H. Kang, Mountain View, CA (US); Joseph J. Snyder, Wenonah, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/993,973

(22) Filed: Aug. 14, 2020

(65) Prior Publication Data

US 2022/0052878 A1 Feb. 17, 2022

(51) Int. Cl.
*H04L 12/46* (2006.01)
*H04L 49/00* (2022.01)
*H04L 12/66* (2006.01)
*H04L 61/256* (2022.01)
*H04L 101/668* (2022.01)

(52) U.S. Cl.
CPC .......... *H04L 12/4641* (2013.01); *H04L 12/66* (2013.01); *H04L 49/70* (2013.01); *H04L 61/256* (2013.01); *H04L 61/6068* (2013.01)

(58) Field of Classification Search
CPC ..... H04L 12/4641; H04L 12/66; H04L 49/70; H04L 61/256; H04L 61/6068

USPC ......................................................... 370/401
See application file for complete search history.

(56) References Cited

U.S. PATENT DOCUMENTS

| 8,307,072 | B1* | 11/2012 | Melvin | ............... | H04L 61/6022 |
|           |     |         |        |                | 709/224 |
| 8,625,431 | B2* | 1/2014  | Droux  | ..................... | H04L 12/42 |
|           |     |         |        |                | 370/236 |
| 8,819,362 | B1  | 8/2014  | Duprey et al. | | |
| 8,954,574 | B1  | 2/2015  | Chheda et al. | | |
| 9,345,054 | B1* | 5/2016  | Lu     | ..................... | H04M 1/72415 |

(Continued)

OTHER PUBLICATIONS

U.S. Appl. No. 16/993,970, Non-Final Office Action, dated Oct. 28, 2021, 7 pages.

(Continued)

*Primary Examiner* — David P Zarka
(74) *Attorney, Agent, or Firm* — Kilpatrick Townsend & Stockton LLP

(57) ABSTRACT

Techniques for utilising multiple network interfaces for a cloud shell are provided. The techniques include receiving, by a computer system, a command to execute an operation by the computer system, the command being received from a router via a primary virtual network interface card (vNIC). The computer system may execute the operation, generating an output of the operation. The techniques also include transmitting, by the computer system, a message comprising the output of the operation to a shell subnet via a secondary vNIC, the secondary vNIC being configured for unidirectional transmission from the computer system to the shell subnet. The shell subnet may be configured to transmit the output of the operation to an external network via a network gateway.

17 Claims, 14 Drawing Sheets

(56) References Cited

U.S. PATENT DOCUMENTS

| | | | |
|---|---|---|---|
| 9,935,788 B2 | 4/2018 | Fausak et al. | |
| 9,973,567 B2* | 5/2018 | Chen | H04L 12/2834 |
| 10,334,708 B2* | 6/2019 | Kim | H05B 45/00 |
| 10,397,273 B1* | 8/2019 | Stickle | H04L 63/1425 |
| 10,462,056 B2* | 10/2019 | Zhu | H04L 49/3027 |
| 10,664,358 B1 | 5/2020 | Chen et al. | |
| 10,819,958 B2* | 10/2020 | Kim | H04N 21/436 |
| 10,880,405 B2* | 12/2020 | Cooley | H04L 41/0846 |
| 11,003,542 B1 | 5/2021 | Kucherov et al. | |
| 11,038,710 B2* | 6/2021 | Chamarajnager | H04L 12/2832 |
| 2008/0298588 A1 | 12/2008 | Shakkarwar | |
| 2009/0313447 A1 | 12/2009 | Nguyen et al. | |
| 2012/0079221 A1 | 3/2012 | Sivasubramanian et al. | |
| 2012/0084261 A1 | 4/2012 | Parab | |
| 2013/0124807 A1 | 5/2013 | Nielsen et al. | |
| 2016/0119306 A1 | 4/2016 | Matthews et al. | |
| 2017/0085558 A1 | 3/2017 | Ibrahim et al. | |
| 2018/0234294 A1* | 8/2018 | Wadekar | H04L 41/0806 |
| 2019/0097838 A1* | 3/2019 | Sahoo | H04L 45/745 |
| 2019/0303246 A1 | 10/2019 | Gokhale et al. | |
| 2020/0259652 A1 | 8/2020 | Schmaltz, III et al. | |
| 2020/0320199 A1 | 10/2020 | Sheth et al. | |
| 2020/0364734 A1* | 11/2020 | Glazier | G06Q 50/01 |

OTHER PUBLICATIONS

U.S. Appl. No. 17/078,835, "Notice of Allowance", dated Mar. 1, 2022, 10 pages.

U.S. Appl. No. 16/993,970, "Notice of Allowance" dated Dec. 24, 2021, 7 pages.

International Application No. PCT/US2021/045797, "International Search Report and Written Opinion", dated Nov. 24, 2021, 11 pages.

* cited by examiner

TECHNIQUES FOR UTILIZING MULTIPLE NETWORK INTERFACES FOR A CLOUD SHELL

CROSS-REFERENCES TO RELATED APPLICATIONS

This application is related to U.S. Non-Provisional application Ser. No. 16/993,970, filed on Aug. 14, 2020, entitled "TECHNIQUES FOR USING SIGNED NONCES TO SECURE CLOUD SHELLS," and U.S. Non-Provisional application Ser. No. 17/078,835, filed on Oct. 23, 2020, entitled "TECHNIQUES FOR PERSISTING DATA ACROSS INSTANCES OF A CLOUD SHELL," the disclosures of which are incorporated by reference in their entirety for all purposes.

BACKGROUND

Cloud-based platforms provide scalable and flexible computing resources for users. Such cloud-based platforms, also referred to as infrastructure as a service (IaaS), may offer entire suites of cloud solutions around a customer's data, for example, solutions for authoring transformations, loading data, and presenting the data. IaaS systems may implement security protocols to protect against unauthorized access to compute resources and data.

BRIEF SUMMARY

Techniques are provided (e.g., a method, a system, non-transitory computer-readable medium storing code or instructions executable by one or more processors) for securing cloud shells against unauthorized access by external devices, using multiple network interfaces in coordination with multiple virtual cloud networks isolating different IaaS sub-systems.

In a first aspect, a method includes receiving a command to execute an operation by a computer system, the command being received from a router via a primary virtual network interface card (vNIC); executing the operation; generating an output of the operation; and transmitting a message comprising the output of the operation to a shell subnet via a secondary virtual network interface card, the secondary virtual network interface card being configured for unidirectional transmission from the computer system to the shell subnet. The shell subnet may be configured to transmit the output of the operation to an external network via a network gateway.

In an example, the operation may be requested by a user of a user device, and generating an output of the operation may include generating a return message for the user device and transmitting the return message to the router via the primary virtual network interface card. The primary virtual network interface card may be configured to accept the return message for the user device and reject the message comprising the output of the operation.

In an example, the computer system may be a virtual machine in a first virtual cloud network, the first virtual cloud network being constituted in a private root compartment.

In an example, the router may be in a second virtual cloud network, the second virtual cloud network being different from the first virtual cloud network and being constituted in the private root compartment.

In an example, the shell subnet may be in a third virtual cloud network, the third virtual cloud network being different from the first virtual cloud network and being constituted in a public root compartment.

In an example, the private root compartment may be associated with a first block of IP addresses attributable to network traffic from the private root compartment. The public root compartment may be associated with a second block of IP addresses, the second block of IP addresses being different from the first block of IP addresses. The second block of IP addresses may be attributable to network traffic from one or more users of the computer system.

In an example, the network gateway may be a network address translation (NAT) gateway, being configured to transmit messages using an IP address of a block of IP addresses attributable to network traffic from one or more users of the computer system.

In a second aspect, a computer system includes one or more processors and a memory in communication with the one or more processors, the memory configured to store computer-executable instructions, wherein executing the computer-executable instructions causes the one or more processors to perform steps including one or more steps of the method of the first aspect and subsequent examples.

In a third aspect, a non-transitory computer-readable storage medium, storing computer-executable instructions that, when executed, cause one or more processors of a computer system to perform steps including one or more steps of the method of the first aspect and subsequent examples.

Figure 1:
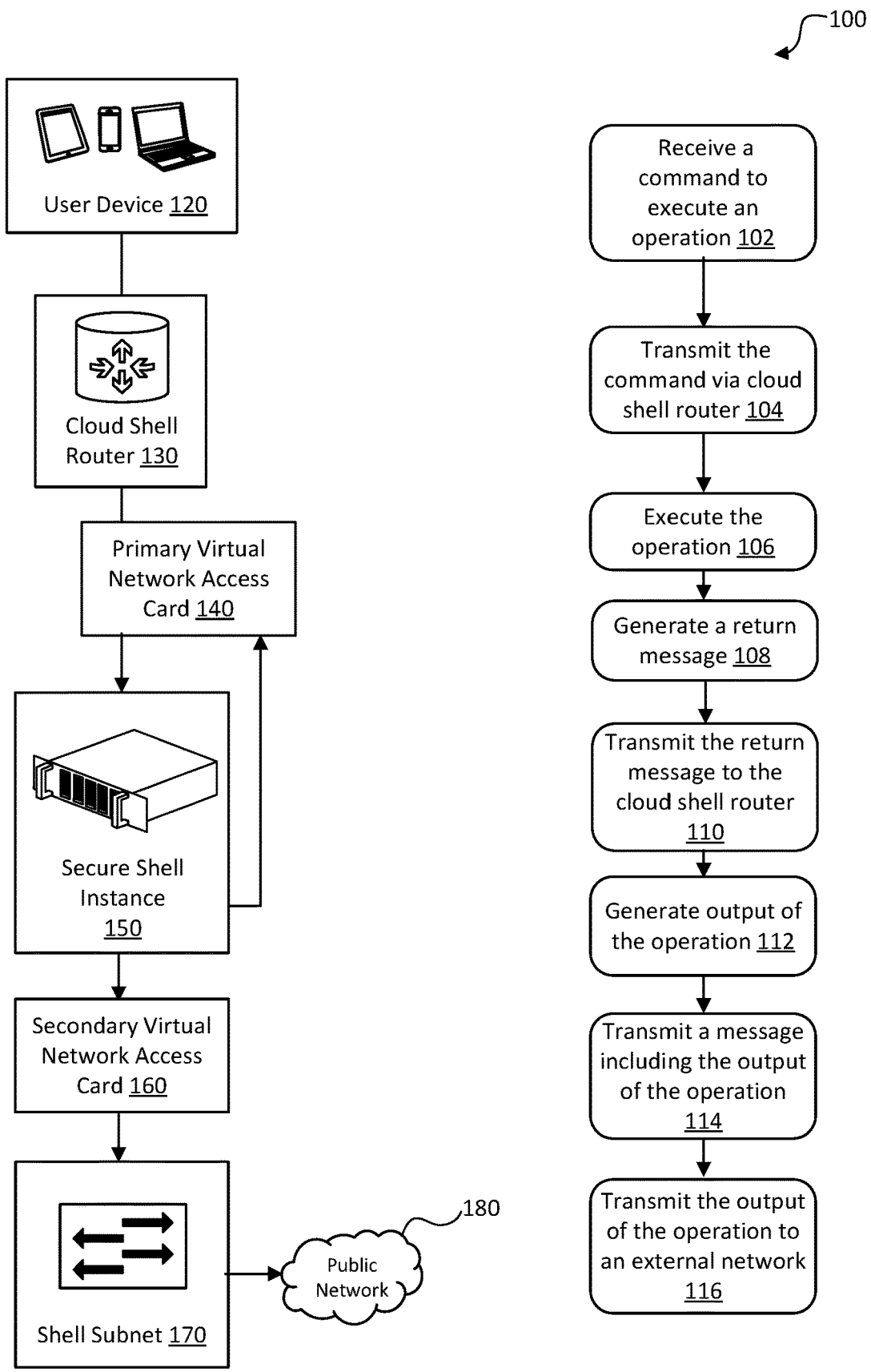
FIG. 1 illustrates an example technique utilizing multiple network interfaces for a secure shell instance, in accordance with one or more embodiments.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Cloud-based platforms provide scalable and flexible computing resources for users. Such cloud-based platforms, also referred to as infrastructure as a service (IaaS), may offer entire suites of cloud solutions around a customer's data, for example solutions for authoring transformations, loading data, and presenting the data. Users of IaaS resources may request to create a secure terminal in a secure shell instance (e.g., a virtual machine running on a virtual cloud network (VCN)), so that operations and data transfers may be carried out securely (e.g., with two-way encryption via a WebSocket secure (wss) connection).

An aspect of secure communication may include controlling network traffic to and from the secure shell instance. Network traffic controls may include one or more techniques and/or approaches to isolating the secure shell instance from one or more IaaS services (e.g., core cloud services) that may be in communication with multiple instances and may have access to and/or control over data and compute resources of the IaaS system. The network traffic controls may include implementing directional limits on network communication into and out of the secure shell instance. The directional limits in turn may block some inbound traffic from external systems, and block outbound traffic to IaaS services. Isolating the secure shell instance may include implementing multiple virtual cloud networks, for example, to isolate core IaaS services from the secure shell instance, both being isolated from network communication services.

As an illustrative example, a user may submit a command to a secure shell instance through a user device (e.g., using a graphical user interface and/or command line interface of a browser). The secure shell instance may be configured with a primary virtual network interface card (vNIC), which one or more security rules may define as ingress-only (unidirectional with respect to inbound network traffic to the secure shell instance). The command may cause the secure shell instance to generate output, which may include an instruction to send the output to an external address (e.g., over the internet). The secure shell instance may send the output via a secondary vNIC, rather than the primary vNIC. Similarly to the primary vNIC, the secondary vNIC may be configured with security rules limiting network traffic through the secondary vNIC as egress-only (unidirectional with respect to outbound traffic from the secure shell instance). In this way, authorized network traffic may arrive to the secure shell instance via the primary vNIC and may leave the secure shell instance via the secondary vNIC. Furthermore, the secure shell instance may run on a compute isolation VCN, isolated from both a service VCN and a network isolation VCN, which may run IaaS services and network communication services, respectively.

Such an arrangement may provide improved security for both the secure shell instance and the IaaS system as a whole. In part, improved security may result, because the secure shell instance may be limited in its ability to send messages to the service VCN via the primary vNIC, and may be limited in its ability to receive messages from external networks via the network isolation VCN and the secondary vNIC. In this way, unauthorized network traffic from the internet (or other networks) may be unable to access the secure shell instance, and the secure shell instance may be unable to access core IaaS resources without authorization.

FIG. 1 illustrates an example technique 100 utilising multiple network interfaces for a secure shell instance, in accordance with one or more embodiments. Directional control of communication between virtual cloud networks may provide improved security of constituent IaaS resources, and may limit and/or prevent security risks from reaching core IaaS resources. To that end, the example technique 100 may include multiple approaches to controlling the flow of system communications, using one or more system components that may be implemented as virtual systems in a distributed computing system (e.g., a cloud network). In some embodiments, the approaches may be implemented to control the origin and/or destination of communications with a secure shell instance 150, which may be an example of a virtual machine (VM) operating on a virtual cloud network (VCN). In some embodiments, the secure shell instance communicates with other components of a distributed computing system (e.g., routers, subnets, etc.) via one or more virtual network interface cards (vNICs), as described in more detail in reference to FIG. 2, below.

In some embodiments, the example technique 100 includes receiving a command to execute an operation (e.g., operation 102). In some embodiments, the command is generated and/or sent from a user device 120. The user device 120 may include any form of electric device configured to access a network (e.g., the internet and/or a private network), such as a personal computer, a digital workstation, a tablet, a smartphone, etc. The command may include any type of instruction generated by a user of the user device 120 (e.g., via a browser interface of an IaaS provider). For example, the command may include a compute task, a storage task (e.g., input-output operation, moving stored data, data transformation, etc.), a configuration task (e.g., a command accessing operating parameters of the secure shell instance 150), etc. In some embodiments, the user device 120 may communicate with a system service (e.g., a browser interface and/or command line interface service) that directs the command to an appropriate sub-system and/or cloud network resource. Such an arrangement may provide network isolation and/or improved system security through network isolation. For example, using a secondary vNIC in a VCN on a different tenancy from that of IaaS services may permit user outgoing network traffic to be identifiable (e.g., a source IP address may come from a different IP address pool from that of IaaS services), as described in more detail in reference to FIG. 2, below.

In some embodiments, the command received in operation 102 is sent to a cloud shell router 130. The cloud shell router may be a virtual router implemented in a virtual cloud network, as described in more detail in reference to FIG. 2, below. The cloud shell router 130 may transmit the command (e.g., operation 104) toward an appropriate addressee (e.g., secure shell instance 150), which may be implemented in a separate virtual cloud network. In some embodiments, implementing separate subsystems that perform the different operations of example technique 100 in separate virtual cloud networks may provide improved security for core cloud resources and/or user data. In some embodiments, the cloud shell router 130 may communicate with the secure shell instance 150 via a primary virtual network access card 140 (vNIC). In some embodiments, the primary vNIC 140 may represent the network interface configuration for the virtual machine on which the secure shell instance 150 is implemented. As such, the primary vNIC 140 may be configured with one or more operational parameters (e.g., a MAC address), as well as security rules, which may permit the primary vNIC 140 to selectively route communications to and/or from the secure shell instance 150, as described in more detail in reference to the figures, below.

In some embodiments, the secure shell instance 150 may execute the operation indicated in the command (e.g., operation 106). As described above, the secure shell instance 150 can be a virtual machine (VM) configured to execute one or more types of operations, including database operations, compute operations, etc. For example, the secure shell instance 150 may execute the command to modify one or more aspects of user IaaS resources and/or data in a compartment of a distributed computer system (e.g., to move data stored in one data center to another data center, to send data to an external server over a public network, etc.).

In some embodiments, the secure shell instance 150 may generate a return message (e.g., operation 108) as a result of executing the operation included in the command. The return message may be intended for the user of the user device 120 and/or the user device 120, rather than for a core IaaS service or an external server (e.g., on a public network or over a private network). In some embodiments, the return message may be generated to provide outcome information in reference to the operation executed by the secure shell instance 150. For example, the secure shell instance 150 may generate the return message to indicate that the operation was successfully completed, was aborted, failed, rescheduled, etc. The return message may include status information, as well as specific data requested as part of the return message (e.g., a checkbit, memory location, etc.).

In some embodiments, the secure shell instance 150 may transmit the return message to the cloud shell router 130 (e.g., operation 110). The secure shell instance 150 may transmit the return message via the primary vNIC 140. As described in more detail in reference to FIG. 2, below, the primary vNIC 140 may be configured to transmit return messages to the cloud shell router 130, but to reject other types of messages received from the secure shell instance 150.

In some embodiments, the secure shell instance 150 may generate output of the operation (e.g., operation 112). The output of the operation may include, but is not limited to, communications, data, and/or instructions to external systems in communication with the secure shell instance 150 over a network (e.g., a public network and/or a private network). The secure shell instance 150 may be instructed to generate the output, for example, when the operation included in the command from the user device 120 includes transferring data over an external network. In the case of transferring data, the secure shell instance 150 may send an instruction to a data management service of the IaaS system, via an internal network of the IaaS system.

As part of executing the command, for example, when the command is to transfer data or send a message to an external server, the secure shell instance 150 may transmit a message including the output of the operation (e.g., operation 114) to a shell subnet 170. The secure shell instance 150 may communicate with the shell subnet 170 via a secondary vNIC 160. As with the primary vNIC 140, the secondary vNIC 160 may be configured with one or more operational parameters (e.g., a different MAC address) and input-output parameters (e.g., security rules) to control the flow of data and messages to the secure shell instance 140. As described in more detail in reference to FIG. 2, below, the secondary vNIC 160 may be configured to be unidirectional, permitting only outgoing messages from the secure shell instance 150 to the shell subnet 170 (e.g., an egress-only configuration). In some embodiments, a unidirectional, egress-only, configuration for the secondary vNIC 160 may permit the secure shell instance 150 to operate with improved security against external risks of interference by penetration and/or unauthorized access by non-user devices.

In some embodiments, the shell subnet 170 may transmit the output of the operation to an external network 180 (e.g., operation 116). In some embodiments, the external network 180 is a public network. In some cases, connecting the secure shell instance 150 and/or the shell subnet 170 to a public network may introduce a security risk due to the potential for malicious systems to attempt to access the secure shell instance 150 and/or core cloud resources. For example, coopting the secure shell instance 150 could provide access to core cloud resources that could, in turn, grant access to user data for multiple users in a cloud service region. For this reason, the shell subnet 170 may communicate with the external network 180 via a network address translation (NAT) gateway, as described in more detail in reference to FIG. 2, below.

As such, the example technique 100 demonstrates how communication between the user device 120, the secure shell instance 150, and the external network 180 may be managed to potentially reduce risk of security threats presented by connecting the secure shell instance to the external network 180. In some embodiments, the example technique 100 provides unidirectional transmission of messages for some types of information, while permitting return messages to be passed back from the secure shell instance 150 to the user device 120. Implementing such controls may provide improved security for user data stored to which the secure shell instance 150 has access, and may isolate the secure shell instance 150 from core cloud services.

Figure 2:
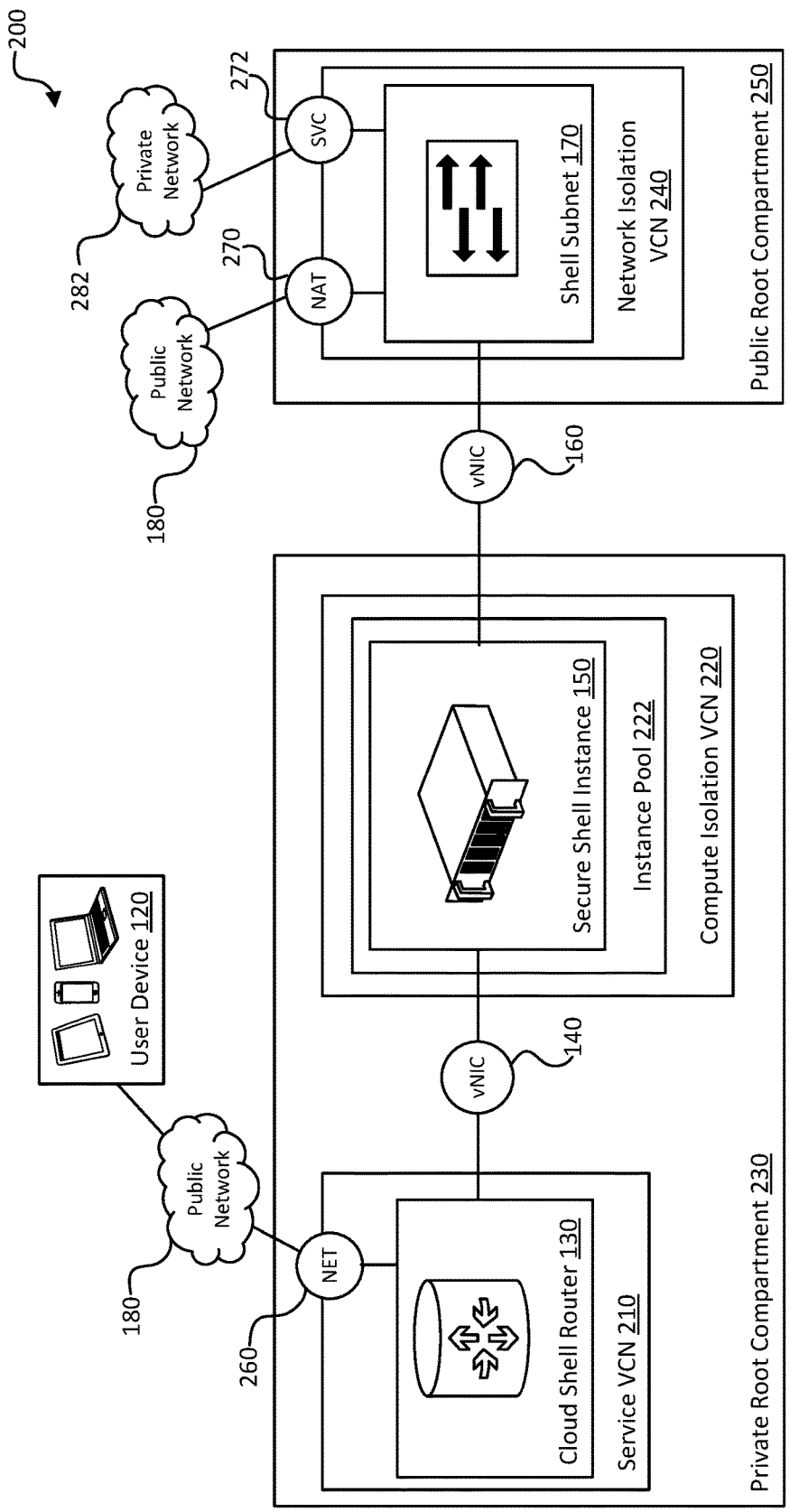
FIG. 2 illustrates an example system utilizing multiple network interfaces for managing communication of a secure shell instance, in accordance with one or more embodiments.

FIG. 2 illustrates an example system 200 utilising multiple network interfaces for managing communication of a secure shell instance, in accordance with one or more embodiments. The various operations described in reference to FIG. 1, above, may be implemented by the example system 200, which may include one or more additional features to potentially improve security of the secure shell instance 150 and core cloud resources.

In some embodiments, the cloud shell router 130, the secure shell instance 150, and the shell subnet 170 may be implemented as virtual systems in separate virtual cloud networks (VCNs). Furthermore, the separate VCNs may be implemented in multiple root compartments (also referred to as "tenancies"). As illustrated in FIG. 2, the cloud shell router 130 is implemented in a service VCN 210, the secure shell instance 150 in a compute isolation VCN 220, with both in a private root compartment 230. By contrast, the shell subnet 170 may be implemented in a network isolation VCN 240 in a public root compartment 250. In general, the private root compartment 230 and the public root compartment 250 may constituted different and/or separate logical containers of data and compute resources implemented in an IaaS system, such that system resources in the private root compartment 230 cannot be accessed by those of the public root compartment 250. The private root compartment 230 and the public root compartment 250 may be associated with different and distinguishable blocks of IP addresses, which may permit the determination of the origin of messages from an IaaS system as from the public root compartment 250 or the private root compartment 230.

In some embodiments, the public root compartment 250 and the constituent systems implemented within the public root compartment 250 (e.g., the shell subnet 170 in the network isolation VCN 240) may be assigned an IP address from a block of IP addresses identified with user output operations (e.g., the message of operation 116 in FIG. 1). By contrast, the private root compartment 230 and the constituent systems implemented within the private root compartment (e.g., the cloud shell router 130 in the service VCN 210) may be assigned an IP address from a block of IP addresses identified with IaaS system communication operations (e.g., communication with external networks such as the external network 180). Using separate blocks of IP addresses, by which the origin of communications may be attributed to either the IaaS system itself or a user of the IaaS system, may improve security of the overall IaaS network (e.g., across multiple data centers, regions, etc.). For example, some IaaS systems may be implemented in multiple data centers (also referred to as domains) in a region, and a global IaaS system may include multiple regions in communication with each other over private and/or public networks. Distinguishing user-source communication from system source communication may reduce the risk of large-scale system traffic-type attacks (e.g., distributed denial of service, or DDOS attacks), from reaching core services.

As an illustrative example, communication from the shell subnet 170 may be attributable to the user of the user device 120 (albeit potentially anonymized) by the IP address of the shell subnet 170. As such, a message from the shell subnet 170 purporting to originate from a core cloud service of the IaaS system may be rejected at the receiver point, for example, for the source IP address and the source identifier (e.g., username) not matching. In another example, isolating outgoing user traffic to a public root compartment may provide improved forensic information to determine a source of a penetration into the IaaS system. By tracing the IP address of source to the public root compartment 250, for example, an investigation may be able to identify a compromised user instance, and may potentially reveal that a core IaaS service has not been compromised.

In some embodiments, the user device 120 (e.g., a browser and/or command line interface executing a secure shell client), may connect with the cloud shell router 130. The user device 120 may connect to the cloud shell router over the external network 180 (e.g., a public network). The external network may 180 include, for example, the internet, an encrypted network, etc. The user device 120 may communicate with the cloud shell router 130 via an internet gateway 260 (e.g., "NET" gateway). The internet gateway 260 can be a virtual router added to the service VCN 210 to provide a path for network traffic between the service VCN 210 and the external network 180.

In some embodiments, the service VCN 210 also implements additional IaaS core services including, but not limited to, secure session manager services, volume manager services instance manager services, and/or web servers, which may facilitate the creation, management, termination, and cleanup of the secure shell instance 150 and its associated data (e.g., block volumes, object storage, etc.).

In some embodiments, the secure shell instance 150 communicates with the cloud shell router 130 via the primary virtual network interface card (vNIC) 140. A vNIC can enable an instance to connect to a VCN and may determine how the instance connects with other systems inside and outside the VCN. As described in reference to FIG. 1, above, the primary vNIC 140 may be configured to manage traffic between the cloud shell router and the secure shell instance 150 (e.g., using a security rule).

Security rules may specify a type of ingress or egress traffic allowed in or out of the primary vNIC 140. For example, the primary vNIC 140 may be configured to accept signals from the cloud shell router 130 to the secure shell instance 150, but to reject output messages from the secure shell instance 150. In some embodiments, the primary vNIC 140 may accept return messages from the secure shell instance 150 addressed to the user device 120, for example, as a response to a request for a return message included in a message from the user device 120. The primary vNIC 140 may be attached to the secure shell instance 150, and security rules (e.g., ingress/egress controls) may be a part of the configuration of the secure shell instance 150 at the time of launch and/or as default features of the secure shell instance 150.

In some embodiments, the secure shell instance 150 can be a virtual machine (e.g., a software-based emulation of a full computer that runs within a physical host computer, also referred to as a "VM") that is specialized for the user of the user device 120 with a configuration file provided by a constituent sub-system of the service VCN 210 (e.g., the session manager service). In some embodiments, the secure shell instance 150 can be selected from an instance pool 222 that contains one or more pre-created instances configured with default parameters. The default parameters may include security rules that define traffic management rules for the primary vNIC 140.

In some embodiments, the secure shell instance 150 includes the secondary vNIC 160. The secondary vNIC 160 may be attached to the secure shell instance 150 during configuration of the pre-created instance from the instance pool 222. Alternatively, the pre-created instances in the instance pool 222 may be pre-configured to include the secondary vNIC 160. In some embodiments, the secondary vNIC includes egress-only security rules (e.g., controls on traffic flow to limit communication only to a single direction from the secure shell instance 150 to the shell subnet 170). As described in more detail in reference to the figures, below. As described above, limiting network traffic in this manner may provide additional and/or improved security for the secure shell instance 150 and the service VCN 210.

In some embodiments, the shell subnet 170 may be configured to communicate with the external network 180 and/or a private IaaS network 282 via one or more virtual routers implemented in the network isolation VCN 240. In some embodiments, the shell subnet 170 may send output traffic received from the secure shell instance 150 via the secondary vNIC 160 to the external network 180 using a network address translation (NAT) gateway 270. The NAT gateway 270 can be a virtual router configured to perform network address translation. A NAT gateway may give cloud resources without public IP addresses access to the internet without exposing those resources to incoming internet connections. For example, the secure shell instance 150 and the shell subnet 170 may lack access to the external network 180, as a security measure to potentially reduce the risk of penetration from malicious attacks. In such cases, the NAT gateway 270 may provide a connection to the internet using an IP address (e.g., from the public block of IP addresses attributable to the public root compartment 250) that is not directly identified with the secure shell instance 150 or the shell subnet 170.

In some embodiments, output from the secure shell instance 150 that involves requests to core IaaS resources may be routed by the shell subnet 170 to a service (SVC) gateway 272. The service gateway 272 can be a virtual router attached to the network isolation VCN 240 that may enable VCN hosts to privately access IaaS services (such as database resources, object storage, metadata management, etc.) without exposing the VCN hosts or the IaaS to the public internet. As such, the service gateway 272 may permit the shell subnet 170 to send output traffic over an internal network 282 (e.g., "private network") configured to communicate with IaaS core services in the region and/or other regions.

Figure 3:
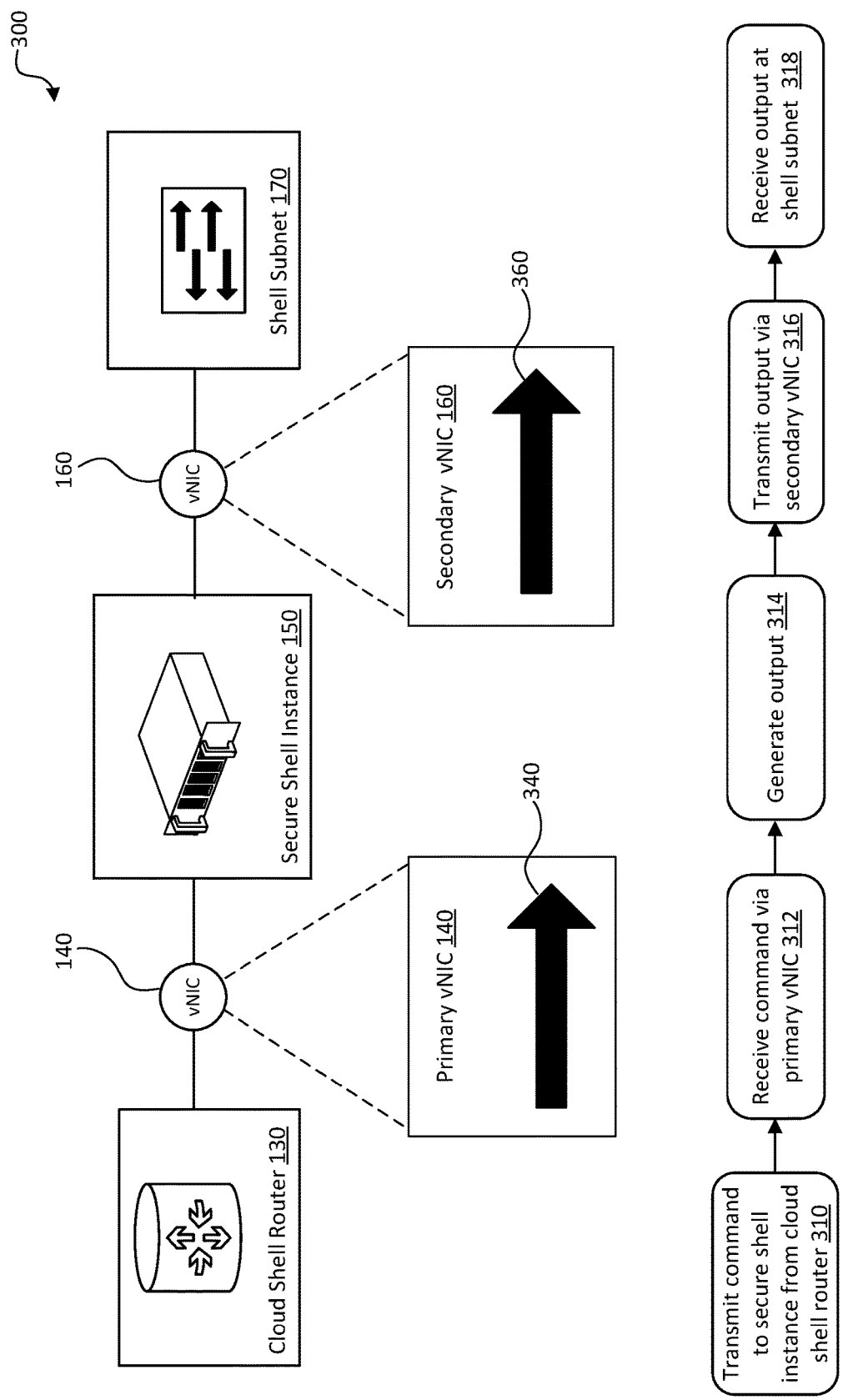
FIG. 3 illustrates an example technique for unidirectional communication by a secure shell instance using multiple network interfaces, in accordance with one or more embodiments.

FIG. 3 illustrates an example technique 300 for unidirectional communication by a secure shell instance using multiple network interfaces, in accordance with one or more embodiments. The configuration of the secure shell instance 150 may include adding one or more additional virtual network interface cards (vNICs) to the secure shell instance 150. The vNICs may permit the secure shell instance 150 to send output messages via a separate communication path from that which may be used to receive instructions and/or commands from a user device (e.g., user device 120 of FIG. 1). In some embodiments, the vNICs may be configured with security rules to define directional control of communication with the secure shell instance 150, as described in more detail, below.

As described in more detail in reference to FIG. 2, the primary vNIC 140 may be configured to facilitate communication between the secure shell instance 150 and the cloud shell router 130. In some embodiments, the secure shell instance 150 may run in a compute isolation virtual cloud network (VCN), while the cloud shell router 130 may run in a service VCN. In some embodiments, the secure shell instance 150 may include the primary vNIC 140 as a default configuration. In some embodiments, the primary vNIC 140 may be configured with security rules that define an ingress-only limitation on communications with the secure shell instance 150. The ingress-only limitation may limit the types of communications that can be received by the secure shell instance 150, and/or may restrict the sources from which communications can be received by the secure shell instance 150.

In some embodiments, the primary vNIC 140 may be configured to permit incoming communications from core cloud resources (e.g., whitelist IaaS system components). For example, the cloud shell router 130 may transmit the command to the secure shell instance 150 (e.g., operation 310). The secure shell instance 150 may receive the command via the primary vNIC 140 (e.g., operation 312) that may be configured to permit communications from the cloud shell router 130. The secure shell instance 150 may then execute the operations indicated in the command and may generate the output described in reference to FIG. 1 (e.g., operation 314).

In some embodiments, the secondary vNIC 160 may be configured to serve as an egress point for communications to facilitate transmission of the output from the secure shell instance 150 to an external network (e.g., external network 180 of FIG. 1) via the shell subnet 170. As described in more detail in reference to FIG. 2, the shell subnet 170 may run in a network isolation VCN to potentially improve security by reducing the risk of penetration by malicious attacks originating from the external network. In some embodiments, the secondary vNIC 160 may be configured during setup of the secure shell instance as a pre-created instance (e.g., in the instance pool 222 of FIG. 2). In some embodiments, the secondary vNIC 160 may be configured during specialization of the secure shell instance 150 (e.g., as by the session manager service, the instance manager service, and/or other core cloud resources). The secondary vNIC 160 may be configured with security rules to permitting outgoing messages from the secure shell instance 150, for example, addressed to the shell subnet 170. For example, the secure shell subnet 150 may transmit the output via the secondary vNIC 160 (e.g., operation 316) and may direct a message containing the output to the shell subnet 170 (e.g., operation 318). In this way, the example technique 300 may include implementing the primary vNIC 140 as the ingress point 340 for communications to the secure shell instance 150 and the secondary vNIC 160 as a separate egress point 360 for communications from the secure shell instance 150.

Figure 4:
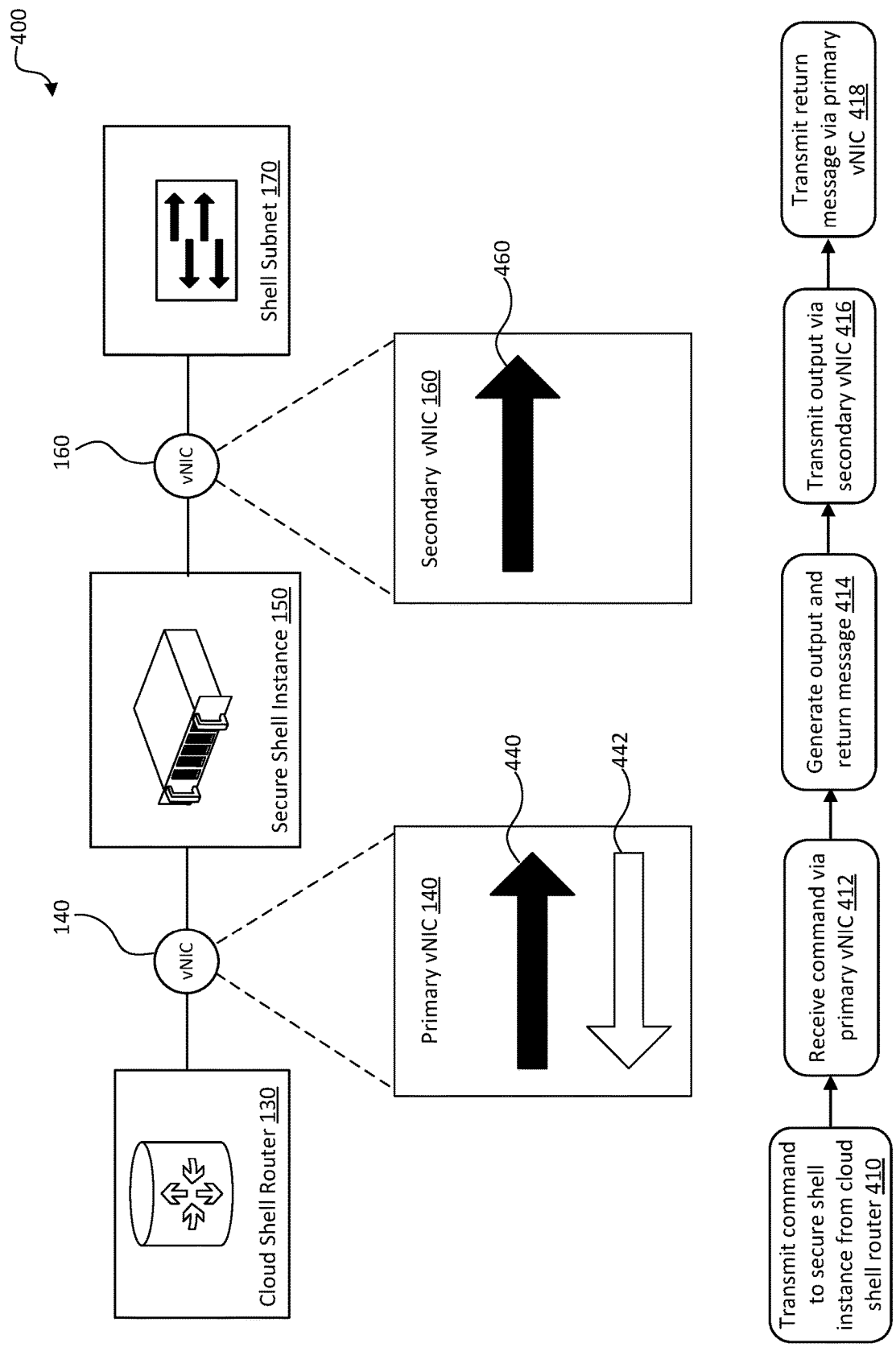
FIG. 4 illustrates an example technique using a first network interface for bi-directional communication with a secure shell instance, in accordance with one or more embodiments.

FIG. 4 illustrates an example technique 400 using a first network interface for bi-directional communication with a secure shell instance, in accordance with one or more embodiments. The secure shell instance 150 may be configured (e.g., during setup and/or specialization) to send messages via both the primary virtual network access card 140 (vNIC) and the secondary vNIC 160, albeit according to a defined approach to provide secure communications and potentially reduce the risk of breach.

In some embodiments, the primary vNIC 140 may include security rules that define a blanket prohibition on all outgoing messages from the secure shell instance 150 (e.g., an ingress-only 440 rule without exceptions). By contrast, the security rules may define a type of communication, a destination of communications, or other exceptions to the security rules. For example, the primary vNIC 140 may be configured to permit transmission of return messages 442 from the secure shell instance 150 to the cloud shell router 130 that are addressed to a user device (e.g., user device 120 of FIG. 1). Such return messages 442 may include status information of the operations, (e.g., completed, aborted, terminated, etc.), and may include other return information request by the user device as part of the command.

As an illustrative example, the secure shell instance 150 may send messages by two different paths 442, 460 depending on the type and/or destination of the messages. In this example, the cloud shell router 130 transmits the command to the secure shell router (e.g., operation 410) and the secure shell instance 150 receives the command from the cloud shell router 130 via the primary vNIC 140 (e.g., operation 412). The secure shell instance 150 may execute the operations indicated by the command and may generate output and a return message (e.g., operation 414). As described in reference to FIG. 3, above, the secure shell instance 150 may send the output as a message addressed to the shell subnet 170 via the secondary vNIC 160 (e.g., operation 416). By contrast, the secure shell instance 150 may send the return message by a different path 442, via the primary vNIC 140, back to the cloud shell router 130 (e.g., operation 418).

Configuring the primary vNIC 140 to permit return messages may provide additional security to the system implementing example technique 400. For example, return messages including status information may be used by core cloud services to track and manage resource usage by the secure shell instance 150. Furthermore, configuring the secure shell instance 150 to send return messages to the cloud shell router 130, rather than the shell subnet 170 may potentially reduce the risk of the secure shell instance being commandeered by an external system, were the shell subnet 170 to be compromised, at least in part if the external system cannot receive feedback that permits it to replace the owner of the secure shell instance 150.

Figure 5:
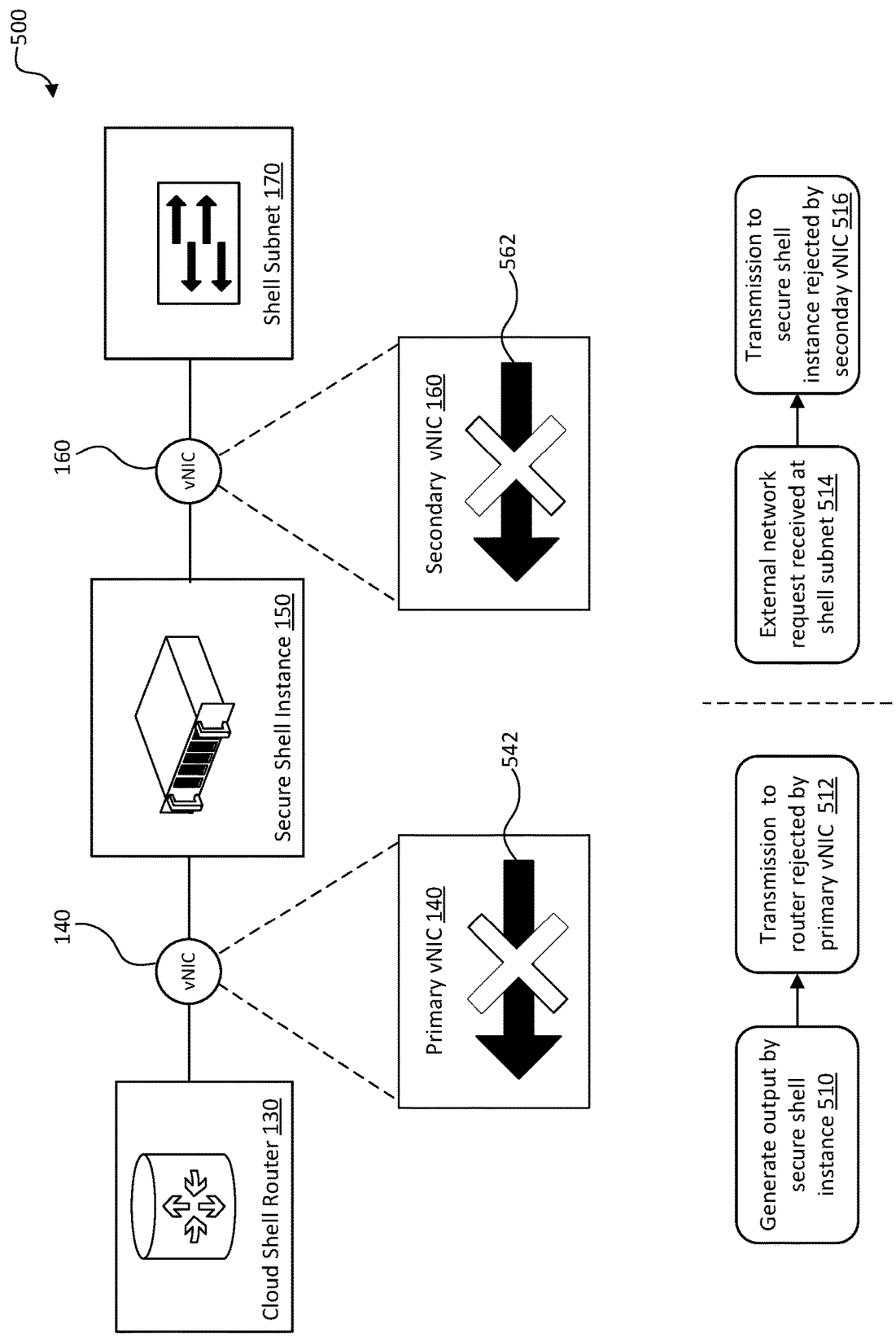
FIG. 5 illustrates an example technique for unidirectional communication with a secure shell instance, in accordance with one or more embodiments.

FIG. 5 illustrates an example technique 500 for unidirectional communication with a secure shell instance, in accordance with one or more embodiments. The corollary of the security rules described in reference to FIGS. 3-4, above, may include that the secure shell instance 150 may be limited in the type and manner of communication it may be configured to implement with regard to output from operations it executes.

In some embodiments, the primary virtual network interface card 140 (vNIC) may be configured with security rules that do not permit output messages from the secure shell instance 150 to be sent via the primary vNIC 140. This may be implemented to control access from the secure shell instance 150, which may run on a compute isolation virtual cloud network (VCN) (e.g., compute isolation VCN 220 of FIG. 2), to core cloud services running on a service VCN (e.g., service VCN 210 of FIG. 2). While some types of messages may be permitted (e.g., return messages), as described in more detail in reference to FIG. 4, above, output messages, which may include additional and/or alternative types of messages (e.g., execute commands, data transformation instructions, input-output operation instructions, etc.). Limiting the type of communications permitted by the primary vNIC 140 may, therefore, potentially reduce the risk of breaching the service VCN or core cloud services by the secure shell instance 150.

In an illustrative example, the primary vNIC 140 may be configured to be ingress-only with respect to output messages from the secure shell instance 150. As such, when the secure shell instance 150 executes the command from a user device (e.g., user device 120 of FIG. 1) and generates output (e.g., operation 510), a transmission of the output addressed to the cloud shell router 130 may be rejected by the primary vNIC 140 (e.g., operation 512). Rejection by the primary vNIC 140 may describe any number of logical operations that prevent the output message from being sent to the cloud shell router 130 and/or any other component systems of the service VCN. For example, the security rules may blacklist specific destinations by address (e.g., MAC address).

In some embodiments, the secondary vNIC 160 may be configured with security rules that do not permit the secure shell instance 150 to receive network traffic via the secondary vNIC 160. This may be implemented to control access to the secure shell instance 150 by the shell subnet 170 which may communicate with the internet, and, as such, may be at risk of attack by external systems. The security rules implemented as part of configuring the secondary vNIC 160 may include a blanket limitation on all inbound communications from the shell subnet 170 or any other IaaS system to the secure shell instance. Alternatively, types of communication, sources, or specific messages may be permitted as part of configuring the secondary vNIC 160 (e.g., whitelisting).

In an illustrative example, the secondary vNIC 160 may be configured to be egress-only with respect to communications to the secure shell instance 150. In this example, an external network request may be received at the shell subnet 170 (e.g., operation 514). The external network request may be an instruction for the shell subnet 170 to send a command to the secure shell instance 150 (for example, to read data stored in a block volume system attached to the secure shell instance 150). The secondary vNIC 160, being configured for egress-only in this example, may be limited to unidirectional communication, permitting the secure shell instance 150 to send output messages via the secondary vNIC but may reject 562 the external network request from the shell subnet 170 (e.g., operation 516).

In some embodiments, the secondary vNIC 160 may similarly reject 562 any incoming message even when received from other origins. For example, the MAC address of the secondary vNIC 160 may be discovered by an external system, which may attempt to address the secondary vNIC 160 directly. Egress-only security configuration may similarly protect the secure shell instance 150 from such attempts.

Figure 6:
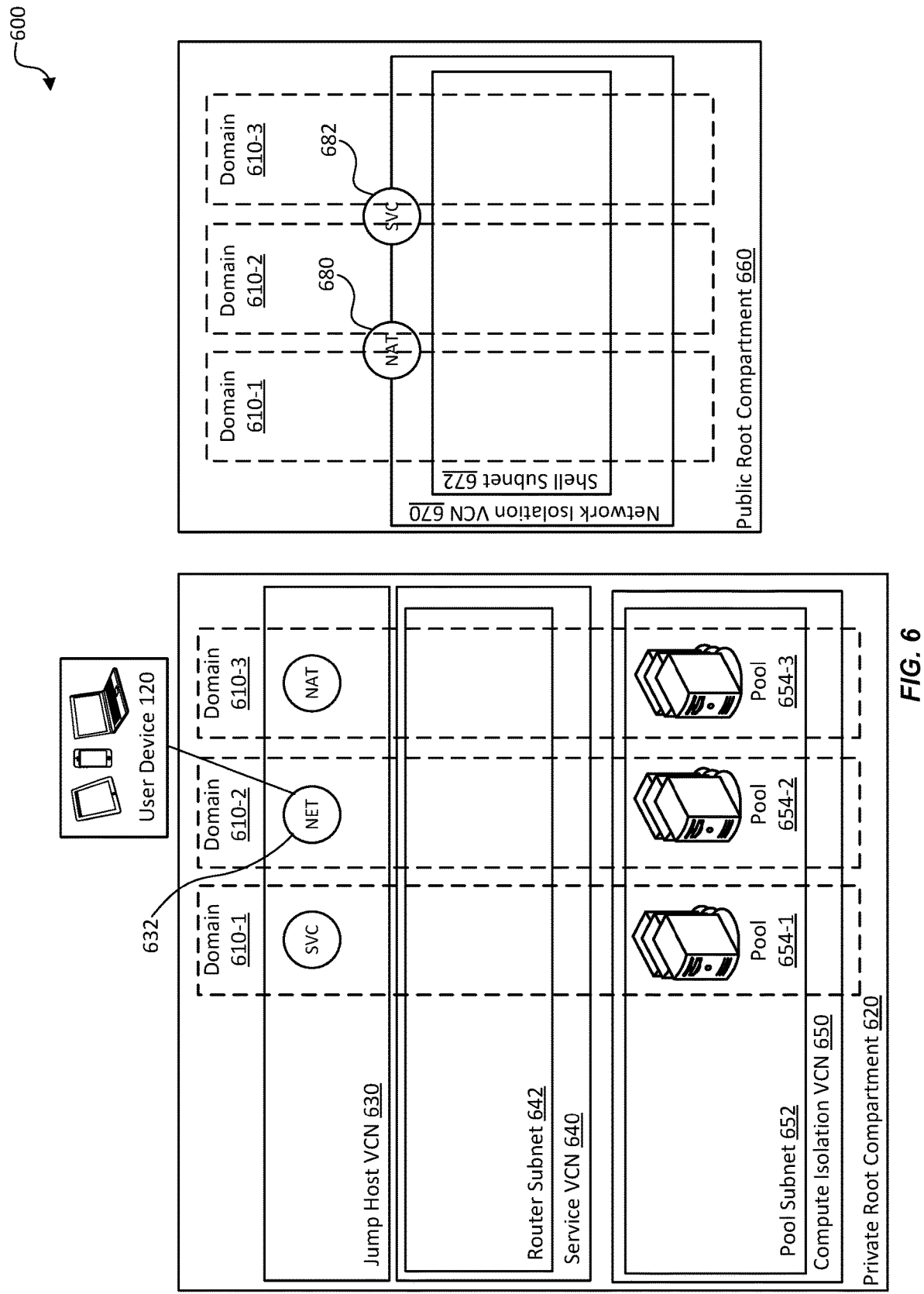
FIG. 6 illustrates an example regional system for managing communication of a secure shell instance, in accordance with one or more embodiments.

FIG. 6 illustrates an example system 600 for managing communication of a secure shell instance in a regional cloud system, in accordance with one or more embodiments. The techniques described in reference to the previous figures may be implemented in a regional IaaS system. Regional IaaS systems may include multiple domains 610, where a domain may be an IaaS identifier corresponding to a data center, being a physical installation of computer hardware configured to operate the IaaS system (e.g., servers, network infrastructure, etc.). Some components of the example system 600 may be regional, while others may be domain specific. Implementing a regional system may potentially reduce system overhead and reduce the demand on system resources attributed to the use of multiple communication points (e.g., ingress points and egress points). Furthermore, implementing unified communication resources may provide improved security, by limiting the number of access points to secure shell instances and core cloud services.

In some embodiments, as described in more detail in reference to FIG. 2, the example system 600 may include two or more root compartments, associated with different blocks of IP addresses. For example, a private root compartment 620 may include a regional jump host virtual cloud network (VCN) 630, a regional service VCN 640, and a regional compute isolation VCN 650. Similarly, a public root compartment 660 may include a regional network isolation VCN 670 configured to connect to an external network (e.g., external network 180 of FIG. 1) via a regional network address translation (NAT) gateway 680, and to core cloud services via a regional service gateway 682.

In some embodiments, the jump host VCN 630 may be include a regional network gateway 632 (NET), which may permit network traffic between the constituent networks of the private root compartment 620 with external networks (e.g., the internet, a private user network, etc.). For example, a command may be received from the user device 120 via the regional network gateway 632. In some embodiments, the jump host VCN 630 may be configured to send the command to a regional router subnet 642 running on the regional service VCN 640. The regional router subnet 642 may direct the command to the pool subnet 652, addressed to a secure shell instance (e.g., secure shell instance 150 of FIG. 1) running in a pool of instances 654. In some embodiments, each domain 610 may include a pool of instances 654, running on the pool subnet 652. The pools 654 may, in turn, include multiple secure shell instances associated with secure shells created for users of the IaaS secure shell service. Each secure shell instance may include multiple virtual network interface cards (vNICs), as described in more detail in reference to the preceding figures.

In some embodiments, output messages from instances running on the pool subnet 652 in the compute isolation VCN 650 may be directed to the regional shell subnet 672 running on the network isolation VCN 670. By contrast, return messages, addressed to user devices, may be directed to the router subnet 642 running on the service VCN 640. The regional subnets may direct the messages to the external addressees via the appropriate gateways.

Figure 7:
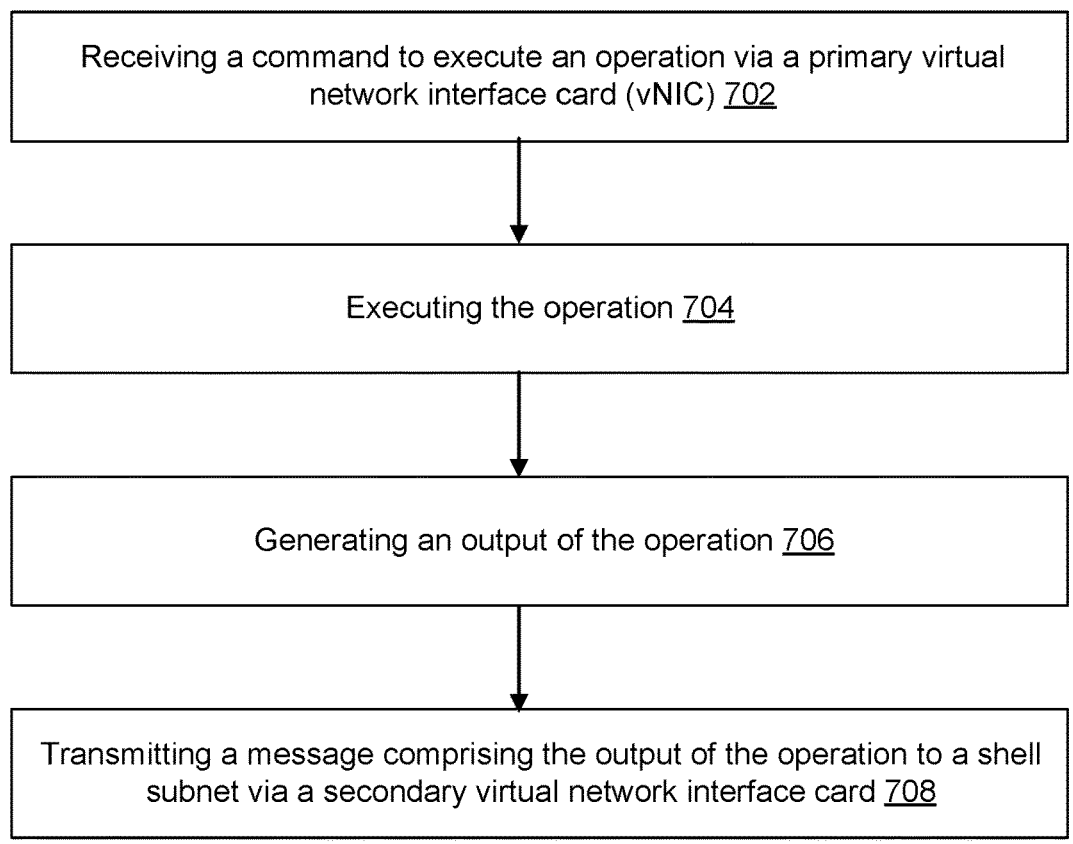
FIG. 7 illustrates an example flow for utilizing multiple network interfaces for a secure shell instance, in accordance with one or more embodiments.

FIG. 7 illustrates an example flow 700 for utilising multiple network interfaces for a secure shell instance, in accordance with one or more embodiments. The operations of the flow can be implemented as hardware circuitry and/or stored as computer-readable instructions on a non-transitory computer-readable medium of a computer system, such as the secure shell instance 150 of FIG. 1. As implemented, the instructions represent modules that include circuitry or code executable by a processor(s) of the computer system. The execution of such instructions configures the computer system to perform the specific operations described herein. Each circuitry or code in combination with the processor performs the respective operation(s). While the operations are illustrated in a particular order, it should be understood that no particular order is necessary and that one or more operations may be omitted, skipped, and/or reordered.

In an example, the flow 700 includes an operation 702, where the computer system receives a command to execute an operation via a primary virtual network interface card (vNIC). As described in more detail in reference to FIG. 1 and FIGS. 3-4, above, the primary vNIC (e.g., primary vNIC 140 of FIG. 1) may be configured during the creation and/or specialization of the secure cloud instance (e.g., secure cloud instance 150 of FIG. 1) with security rules. The security rules may control network traffic to the secure shell instance, such that the primary vNIC may be configured to be ingress-only with respect to one or more types of network traffic. For example, the primary vNIC may be configured to limit network traffic between the secure shell instance and external systems (e.g., core cloud services, external network devices, etc.) such that the secure shell instance may receive incoming traffic via the primary vNIC, but may not send outgoing traffic via the primary vNIC.

In an example, the flow 700 includes an operation 704, where the computer system executes the operation. The secure shell instance may be a virtual machine (VM), hosted on a virtual cloud network (VCN), as described in more detail in reference to FIG. 2, above. As such, the secure shell instance may include compute resources (e.g., cores, threads, etc.) and may include data storage (e.g., block volumes, etc.). In some cases, the secure shell instance may be configured to execute commands received via a secure shell (e.g., a terminal, bash shell, etc.) created to securely connect a user of a user device (e.g., user device 120 of FIG. 1) to the secure shell instance, for example, over an encrypted connection (e.g., a WebSocket Secure connection).

In an example, the flow 700 includes an operation 706, where the computer system generates an output of the operation. In some embodiments, the output may include moving data, sending requested information, and/or other types of output from the secure shell instance. Considering that such output may include confidential information, implementing network traffic controls may potentially reduce the risk of misdirecting the output to an unauthorized addressee.

In an example, the flow 700 includes an operation 708, where the computer system transmits a message comprising the output of the operation to a shell subnet via a secondary virtual network interface card (e.g., secondary vNIC 160 of FIG. 1). The secondary vNIC may be configured with security rules defining a unidirectional limitation on network traffic, for example, for sending output from the secure shell instance to a shell subnet (e.g., shell subnet 170). As described in more detail in reference to FIG. 2, the shell subnet and the secure shell instance may run in different VCNs, isolated from one another, which may potentially improve communication security.

Figure 8:
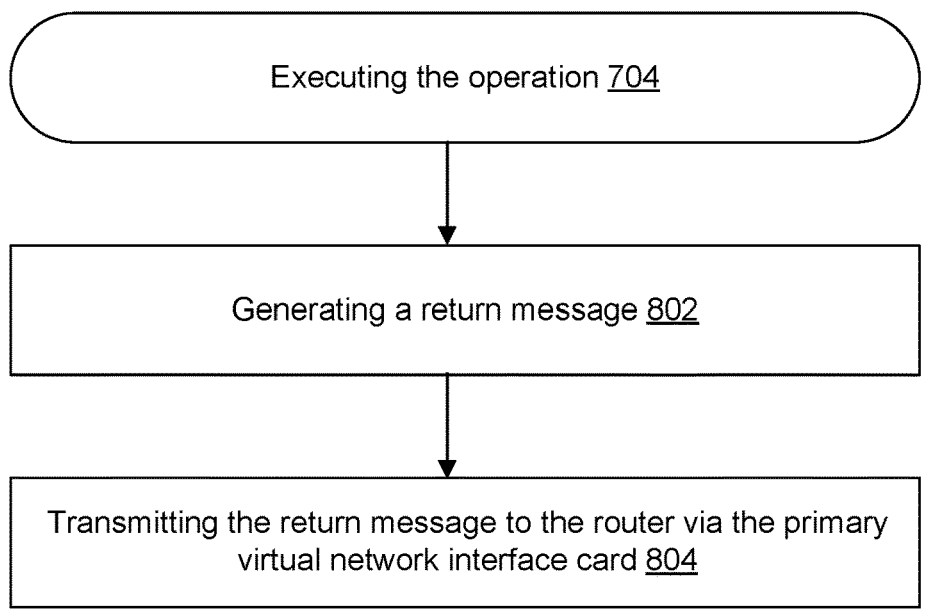
FIG. 8 illustrates an example flow for bi-directional communication with a secure shell instance using a network interface, in accordance with one or more embodiments.

FIG. 8 illustrates an example flow 800 for bi-directional communication with a secure shell instance using a network interface, in accordance with one or more embodiments. The operations of the flow can be implemented as hardware circuitry and/or stored as computer-readable instructions on a non-transitory computer-readable medium of a computer system, such as the secure shell instance 150 of FIG. 1. As implemented, the instructions represent modules that include circuitry or code executable by a processor(s) of the computer system. The execution of such instructions configures the computer system to perform the specific operations described herein. Each circuitry or code in combination with the processor performs the respective operation(s). While the operations are illustrated in a particular order, it should be understood that no particular order is necessary and that one or more operations may be omitted, skipped, and/or reordered.

In an example, the flow 800 begins following operation 704 of FIG. 7, where the computer system executes the operation. In particular, the computer system (e.g., the secure shell instance 150 of FIG. 1), may implement one or more operations associated with communication of operation output as described in reference to the operations described in FIG. 8.

In an example, the flow 800 includes an operation 802, where the computer system generates a return message for the user device. as described in more detail in reference to FIG. 1 and FIG. 4, the secure shell instance may generate a return message as part of executing the operation. The return message may be a message for the user device (e.g., user device 120 of FIG. 1). For example, the return message may be a confirmation, a status, or a checkbit, that may have been included as part of the command received from the user device.

In an example, the flow 800 includes an operation 804, where the computer system transmits the return message to the router via the primary virtual network interface card (e.g., primary vNIC 140 of FIG. 1). As described in more detail in reference to FIG. 4, the primary vNIC may be configured for unidirectional network traffic, allowing inbound traffic to reach the secure shell instance, but not allowing outbound traffic from the secure shell instance to the IaaS services (e.g., the cloud shell router 130 of FIG. 1). In some embodiments, the primary vNIC may be configured to permit the return message to be sent to the cloud shell router, to be sent to the user device via one or more elements running in the service VCN (e.g., service VCN 210 of FIG. 2)

Figure 9:
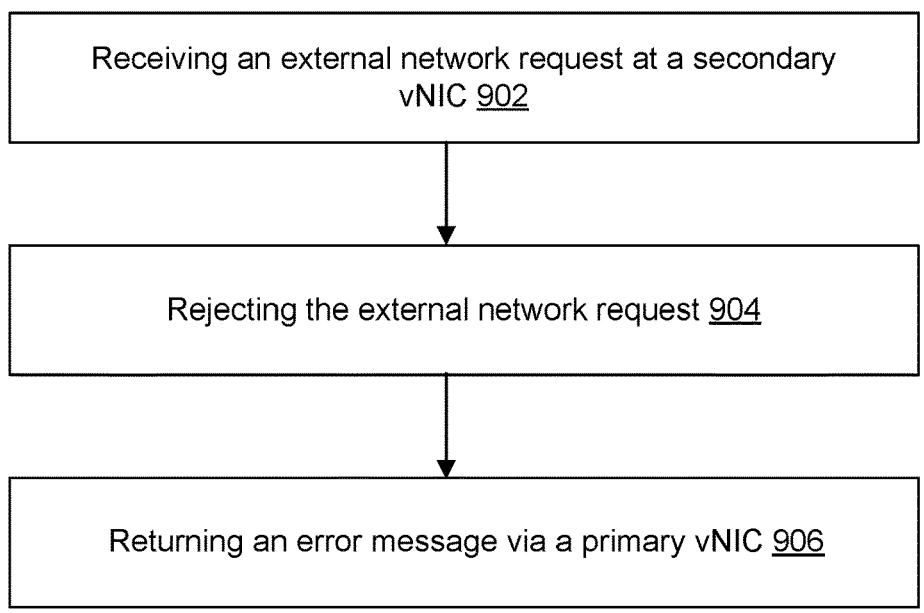
FIG. 9 illustrates an example flow for unidirectional communication from a secure shell instance using a network interface, in accordance with one or more embodiments.

FIG. 9 illustrates an example flow 900 for bi-directional communication with a secure shell instance using a network interface, in accordance with one or more embodiments. The operations of the flow can be implemented as hardware circuitry and/or stored as computer-readable instructions on a non-transitory computer-readable medium of a computer system, such as the secure shell instance 150 of FIG. 1. As implemented, the instructions represent modules that include circuitry or code executable by a processor(s) of the computer system. The execution of such instructions configures the computer system to perform the specific operations described herein. Each circuitry or code in combination with the processor performs the respective operation(s). While the operations are illustrated in a particular order, it should be understood that no particular order is necessary and that one or more operations may be omitted, skipped, and/or reordered.

In an example, the flow 900 includes an operation 902, where the computer system receives an external network request via a secondary virtual network interface card (vNIC). As described in more detail in reference to the preceding paragraphs, the secondary vNIC (e.g., secondary vNIC 160 of FIG. 1) may be configured for unidirectional network traffic from the secure shell instance (e.g., through configuration of security rules during setup of the secure shell instance). As such, in cases where an external network request reaches the secondary vNIC, it may be that the request is unauthorized or was erroneously addressed to the secondary vNIC.

In an example, the flow 900 includes an operation 904, where the computer system rejects the external network request. The secondary vNIC may, in some cases, be configured to reject incoming network requests. For example, the security rules included in the configuration of the secondary vNIC may define the secondary vNIC as unidirectional without exception.

In an example, the flow 900 includes an operation 906, where the computer system returns an error message. In some embodiments, returning an error message may be accompanied by storing identifier information describing the external network request (e.g., username, login credentials, IP address, etc.) for potential use by IaaS security services. For example, an audit of unauthorized inbound network traffic may help to identify whether one or more IaaS services and/or user instances may have been compromised. In some embodiments, the error message may be directed to an IaaS security service directly, for example, as a notification that an unauthorized inbound request was received at the secondary vNIC (being egress-only).

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 10:
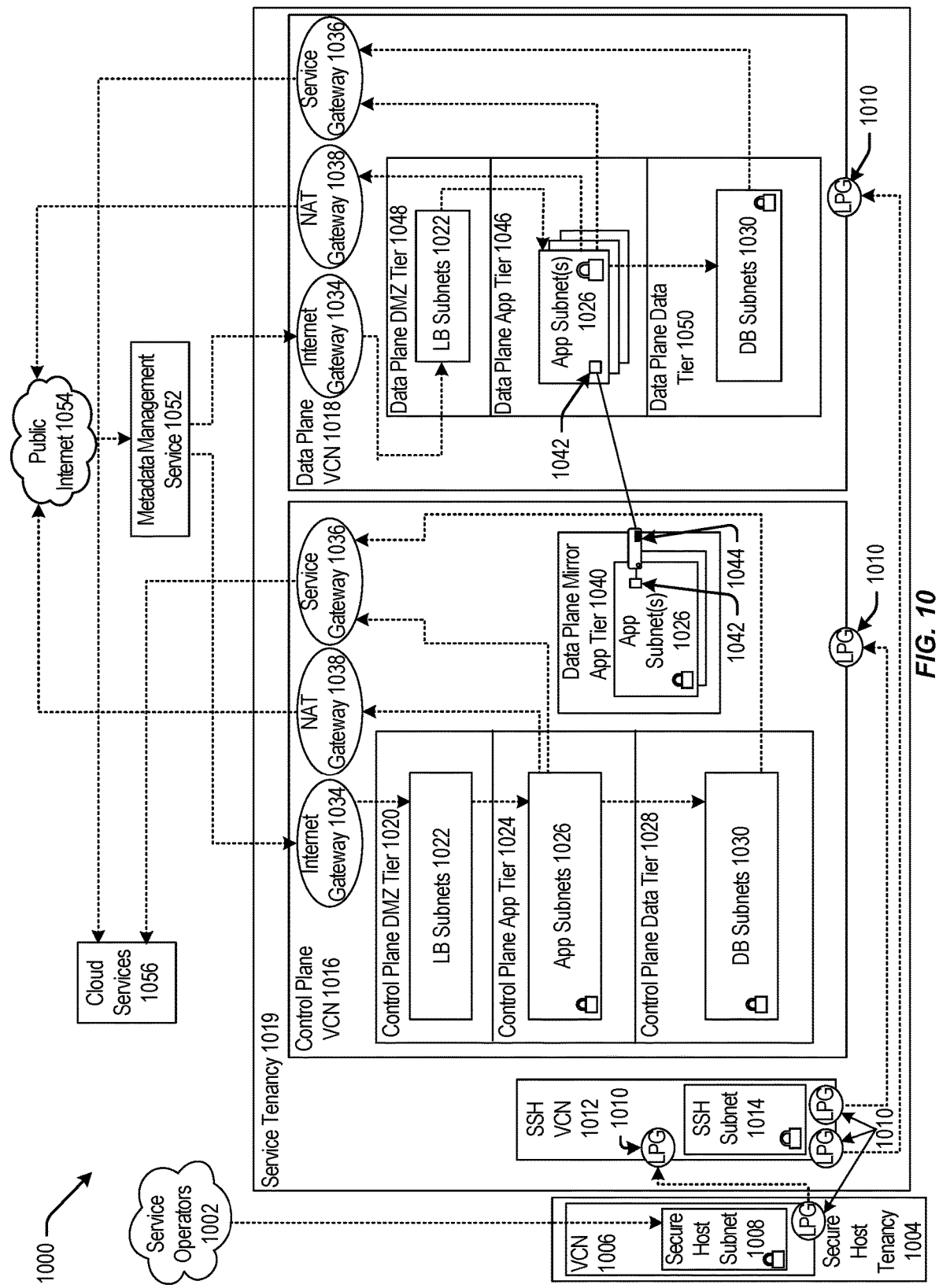
FIG. 10 is a block diagram illustrating one pattern for implementing a cloud infrastructure as a service system, according to at least one embodiment.

FIG. 10 is a block diagram 1000 illustrating an example pattern of an IaaS architecture, according to at least one embodiment. Service operators 1002 can be communicatively coupled to a secure host tenancy 1004 that can include a virtual cloud network (VCN) 1006 and a secure host subnet 1008. In some examples, the service operators 1002 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1006 and/or the Internet.

The VCN 1006 can include a local peering gateway (LPG) 1010 that can be communicatively coupled to a secure shell (SSH) VCN 1012 via an LPG 1010 contained in the SSH VCN 1012. The SSH VCN 1012 can include an SSH subnet 1014, and the SSH VCN 1012 can be communicatively coupled to a control plane VCN 1016 via the LPG 1010 contained in the control plane VCN 1016. Also, the SSH VCN 1012 can be communicatively coupled to a data plane VCN 1018 via an LPG 1010. The control plane VCN 1016 and the data plane VCN 1018 can be contained in a service tenancy 1019 that can be owned and/or operated by the IaaS provider.

The control plane VCN 1016 can include a control plane demilitarized zone (DMZ) tier 1020 that acts as a perimeter network (e.g., portions of a corporate network between the corporate intranet and external networks). The DMZ-based servers may have restricted responsibilities and help keep security breaches contained. Additionally, the DMZ tier 1020 can include one or more load balancer (LB) subnet(s) 1022, a control plane app tier 1024 that can include app subnet(s) 1026, a control plane data tier 1028 that can include database (DB) subnet(s) 1030 (e.g., frontend DB subnet(s) and/or backend DB subnet(s)). The LB subnet(s) 1022 contained in the control plane DMZ tier 1020 can be communicatively coupled to the app subnet(s) 1026 contained in the control plane app tier 1024 and an Internet gateway 1034 that can be contained in the control plane VCN 1016, and the app subnet(s) 1026 can be communicatively coupled to the DB subnet(s) 1030 contained in the control plane data tier 1028 and a service gateway 1036 and a network address translation (NAT) gateway 1038. The control plane VCN 1016 can include the service gateway 1036 and the NAT gateway 1038.

The control plane VCN 1016 can include a data plane mirror app tier 1040 that can include app subnet(s) 1026. The app subnet(s) 1026 contained in the data plane mirror app tier 1040 can include a virtual network interface controller (VNIC) 1042 that can execute a compute instance 1044. The compute instance 1044 can communicatively couple the app subnet(s) 1026 of the data plane mirror app tier 1040 to app subnet(s) 1026 that can be contained in a data plane app tier 1046.

The data plane VCN 1018 can include the data plane app tier 1046, a data plane DMZ tier 1048, and a data plane data tier 1050. The data plane DMZ tier 1048 can include LB subnet(s) 1022 that can be communicatively coupled to the app subnet(s) 1026 of the data plane app tier 1046 and the Internet gateway 1034 of the data plane VCN 1018. The app subnet(s) 1026 can be communicatively coupled to the service gateway 1036 of the data plane VCN 1018 and the NAT gateway 1038 of the data plane VCN 1018. The data plane data tier 1050 can also include the DB subnet(s) 1030 that can be communicatively coupled to the app subnet(s) 1026 of the data plane app tier 1046.

The Internet gateway 1034 of the control plane VCN 1016 and of the data plane VCN 1018 can be communicatively coupled to a metadata management service 1052 that can be communicatively coupled to public Internet 1054. Public Internet 1054 can be communicatively coupled to the NAT gateway 1038 of the control plane VCN 1016 and of the data plane VCN 1018. The service gateway 1036 of the control plane VCN 1016 and of the data plane VCN 1018 can be communicatively couple to cloud services 1056.

In some examples, the service gateway 1036 of the control plane VCN 1016 or of the data plan VCN 1018 can make application programming interface (API) calls to cloud services 1056 without going through public Internet 1054. The API calls to cloud services 1056 from the service gateway 1036 can be one-way: the service gateway 1036 can make API calls to cloud services 1056, and cloud services 1056 can send requested data to the service gateway 1036. But, cloud services 1056 may not initiate API calls to the service gateway 1036.

In some examples, the secure host tenancy 1004 can be directly connected to the service tenancy 1019, which may be otherwise isolated. The secure host subnet 1008 can communicate with the SSH subnet 1014 through an LPG 1010 that may enable two-way communication over an otherwise isolated system. Connecting the secure host subnet 1008 to the SSH subnet 1014 may give the secure host subnet 1008 access to other entities within the service tenancy 1019.

The control plane VCN 1016 may allow users of the service tenancy 1019 to set up or otherwise provision desired resources. Desired resources provisioned in the control plane VCN 1016 may be deployed or otherwise used in the data plane VCN 1018. In some examples, the control plane VCN 1016 can be isolated from the data plane VCN 1018, and the data plane mirror app tier 1040 of the control plane VCN 1016 can communicate with the data plane app tier 1046 of the data plane VCN 1018 via VNICs 1042 that can be contained in the data plane mirror app tier 1040 and the data plane app tier 1046.

In some examples, users of the system, or customers, can make requests, for example create, read, update, or delete (CRUD) operations, through public Internet 1054 that can communicate the requests to the metadata management service 1052. The metadata management service 1052 can communicate the request to the control plane VCN 1016 through the Internet gateway 1034. The request can be received by the LB subnet(s) 1022 contained in the control plane DMZ tier 1020. The LB subnet(s) 1022 may determine that the request is valid, and in response to this determination, the LB subnet(s) 1022 can transmit the request to app subnet(s) 1026 contained in the control plane app tier 1024. If the request is validated and requires a call to public Internet 1054, the call to public Internet 1054 may be transmitted to the NAT gateway 1038 that can make the call to public Internet 1054. Memory that may be desired to be stored by the request can be stored in the DB subnet(s) 1030.

In some examples, the data plane mirror app tier 1040 can facilitate direct communication between the control plane VCN 1016 and the data plane VCN 1018. For example, changes, updates, or other suitable modifications to configuration may be desired to be applied to the resources contained in the data plane VCN 1018. Via a VNIC 1042, the control plane VCN 1016 can directly communicate with, and can thereby execute the changes, updates, or other suitable modifications to configuration to, resources contained in the data plane VCN 1018.

In some embodiments, the control plane VCN 1016 and the data plane VCN 1018 can be contained in the service tenancy 1019. In this case, the user, or the customer, of the system may not own or operate either the control plane VCN 1016 or the data plane VCN 1018. Instead, the IaaS provider may own or operate the control plane VCN 1016 and the data plane VCN 1018, both of which may be contained in the service tenancy 1019. This embodiment can enable isolation of networks that may prevent users or customers from interacting with other users', or other customers', resources. Also, this embodiment may allow users or customers of the system to store databases privately without needing to rely on public Internet 1054, which may not have a desired level of security, for storage.

In other embodiments, the LB subnet(s) 1022 contained in the control plane VCN 1016 can be configured to receive a signal from the service gateway 1036. In this embodiment, the control plane VCN 1016 and the data plane VCN 1018 may be configured to be called by a customer of the IaaS provider without calling public Internet 1054. Customers of the IaaS provider may desire this embodiment since database(s) that the customers use may be controlled by the IaaS provider and may be stored on the service tenancy 1019, which may be isolated from public Internet 1054.

Figure 11:
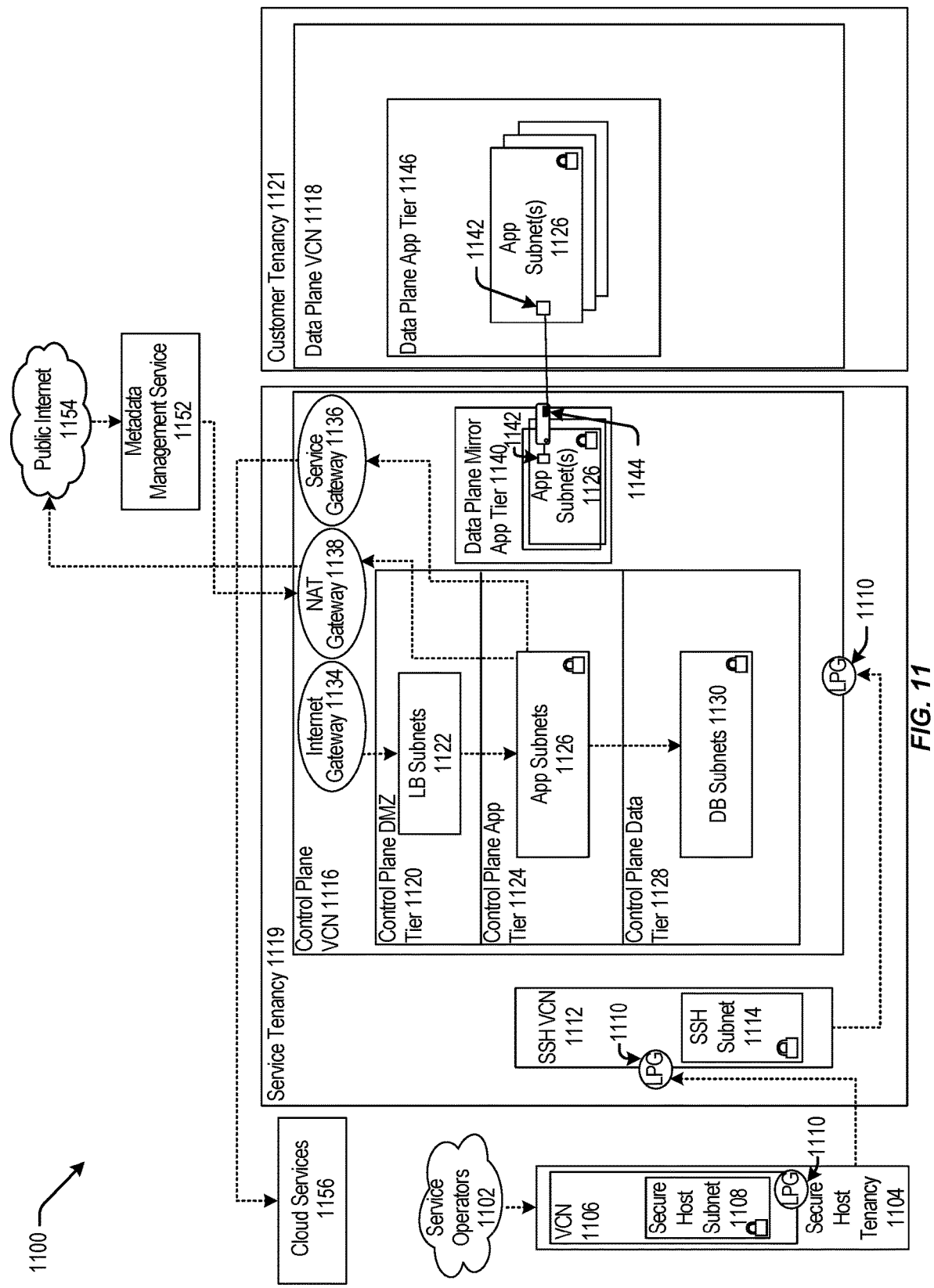
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g. service operators 1002 of FIG. 10) can be communicatively coupled to a secure host tenancy 1104 (e.g. the secure host tenancy 1004 of FIG. 10) that can include a virtual cloud network (VCN) 1106 (e.g. the VCN 1006 of FIG. 10) and a secure host subnet 1108 (e.g. the secure host subnet 1008 of FIG. 10). The VCN 1106 can include a local peering gateway (LPG) 1110 (e.g. the LPG 1010 of FIG. 10) that can be communicatively coupled to a secure shell (SSH) VCN 1112 (e.g. the SSH VCN 1012 of FIG. 10) via an LPG 1010 contained in the SSH VCN 1112. The SSH VCN 1112 can include an SSH subnet 1114 (e.g. the SSH subnet 1014 of FIG. 10), and the SSH VCN 1112 can be communicatively coupled to a control plane VCN 1116 (e.g. the control plane VCN 1016 of FIG. 10) via an LPG 1110 contained in the control plane VCN 1116. The control plane VCN 1116 can be contained in a service tenancy 1119 (e.g. the service tenancy 1019 of FIG. 10), and the data plane VCN 1118 (e.g. the data plane VCN 1018 of FIG. 10) can be contained in a customer tenancy 1121 that may be owned or operated by users, or customers, of the system.

The control plane VCN 1116 can include a control plane DMZ tier 1120 (e.g. the control plane DMZ tier 1020 of FIG. 10) that can include LB subnet(s) 1122 (e.g. LB subnet(s) 1022 of FIG. 10), a control plane app tier 1124 (e.g. the control plane app tier 1024 of FIG. 10) that can include app subnet(s) 1126 (e.g. app subnet(s) 1026 of FIG. 10), a control plane data tier 1128 (e.g. the control plane data tier 1028 of FIG. 10) that can include database (DB) subnet(s) 1130 (e.g. similar to DB subnet(s) 1030 of FIG. 10). The LB subnet(s) 1122 contained in the control plane DMZ tier 1120 can be communicatively coupled to the app subnet(s) 1126 contained in the control plane app tier 1124 and an Internet gateway 1134 (e.g. the Internet gateway 1034 of FIG. 10) that can be contained in the control plane VCN 1116, and the app subnet(s) 1126 can be communicatively coupled to the DB subnet(s) 1130 contained in the control plane data tier 1128 and a service gateway 1136 (e.g. the service gateway of FIG. 10) and a network address translation (NAT) gateway 1138 (e.g. the NAT gateway 1038 of FIG. 10). The control plane VCN 1116 can include the service gateway 1136 and the NAT gateway 1138.

The control plane VCN 1116 can include a data plane mirror app tier 1140 (e.g. the data plane mirror app tier 1040 of FIG. 10) that can include app subnet(s) 1126. The app subnet(s) 1126 contained in the data plane mirror app tier 1140 can include a virtual network interface controller (VNIC) 1142 (e.g. the VNIC of 1042) that can execute a compute instance 1144 (e.g. similar to the compute instance 1044 of FIG. 10). The compute instance 1144 can facilitate communication between the app subnet(s) 1126 of the data plane mirror app tier 1140 and the app subnet(s) 1126 that can be contained in a data plane app tier 1146 (e.g. the data plane app tier 1046 of FIG. 10) via the VNIC 1142 contained in the data plane mirror app tier 1140 and the VNIC 1142 contained in the data plan app tier 1146.

The Internet gateway 1134 contained in the control plane VCN 1116 can be communicatively coupled to a metadata management service 1152 (e.g. the metadata management service 1052 of FIG. 10) that can be communicatively coupled to public Internet 1154 (e.g. public Internet 1054 of FIG. 10). Public Internet 1154 can be communicatively coupled to the NAT gateway 1138 contained in the control plane VCN 1116. The service gateway 1136 contained in the control plane VCN 1116 can be communicatively couple to cloud services 1156 (e.g. cloud services 1056 of FIG. 10).

In some examples, the data plane VCN 1118 can be contained in the customer tenancy 1121. In this case, the IaaS provider may provide the control plane VCN 1116 for each customer, and the IaaS provider may, for each customer, set up a unique compute instance 1144 that is contained in the service tenancy 1119. Each compute instance 1144 may allow communication between the control plane VCN 1116, contained in the service tenancy 1119, and the data plane VCN 1118 that is contained in the customer tenancy 1121. The compute instance 1144 may allow resources, that are provisioned in the control plane VCN 1116 that is contained in the service tenancy 1119, to be deployed or otherwise used in the data plane VCN 1118 that is contained in the customer tenancy 1121.

In other examples, the customer of the IaaS provider may have databases that live in the customer tenancy 1121. In this example, the control plane VCN 1116 can include the data plane mirror app tier 1140 that can include app subnet(s)

1126. The data plane mirror app tier 1140 can reside in the data plane VCN 1118, but the data plane mirror app tier 1140 may not live in the data plane VCN 1118. That is, the data plane mirror app tier 1140 may have access to the customer tenancy 1121, but the data plane mirror app tier 1140 may not exist in the data plane VCN 1118 or be owned or operated by the customer of the IaaS provider. The data plane mirror app tier 1140 may be configured to make calls to the data plane VCN 1118 but may not be configured to make calls to any entity contained in the control plane VCN 1116. The customer may desire to deploy or otherwise use resources in the data plane VCN 1118 that are provisioned in the control plane VCN 1116, and the data plane mirror app tier 1140 can facilitate the desired deployment, or other usage of resources, of the customer.

In some embodiments, the customer of the IaaS provider can apply filters to the data plane VCN 1118. In this embodiment, the customer can determine what the data plane VCN 1118 can access, and the customer may restrict access to public Internet 1154 from the data plane VCN 1118. The IaaS provider may not be able to apply filters or otherwise control access of the data plane VCN 1118 to any outside networks or databases. Applying filters and controls by the customer onto the data plane VCN 1118, contained in the customer tenancy 1121, can help isolate the data plane VCN 1118 from other customers and from public Internet 1154.

In some embodiments, cloud services 1156 can be called by the service gateway 1136 to access services that may not exist on public Internet 1154, on the control plane VCN 1116, or on the data plane VCN 1118. The connection between cloud services 1156 and the control plane VCN 1116 or the data plane VCN 1118 may not be live or continuous. Cloud services 1156 may exist on a different network owned or operated by the IaaS provider. Cloud services 1156 may be configured to receive calls from the service gateway 1136 and may be configured to not receive calls from public Internet 1154. Some cloud services 1156 may be isolated from other cloud services 1156, and the control plane VCN 1116 may be isolated from cloud services 1156 that may not be in the same region as the control plane VCN 1116. For example, the control plane VCN 1116 may be located in "Region 1," and cloud service "Deployment 10," may be located in Region 1 and in "Region 2." If a call to Deployment 10 is made by the service gateway 1136 contained in the control plane VCN 1116 located in Region 1, the call may be transmitted to Deployment 10 in Region 1. In this example, the control plane VCN 1116, or Deployment 10 in Region 1, may not be communicatively coupled to, or otherwise in communication with, Deployment 10 in Region 2.

Figure 12:
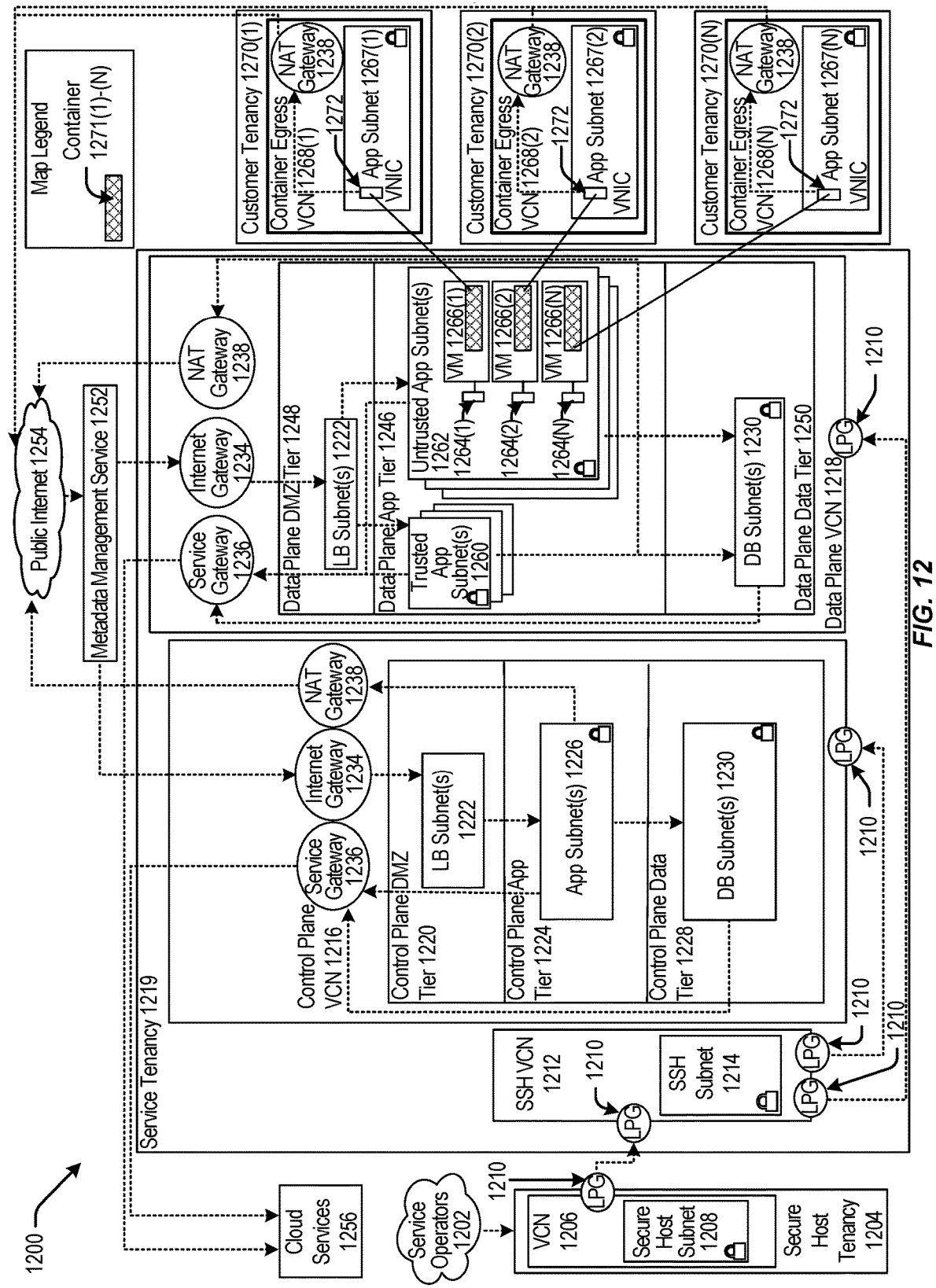
FIG. 12 is a block diagram illustrating another pattern for implementing a cloud infrastructure as a service system, according to at least one embodiment.

FIG. 12 is a block diagram 1200 illustrating another example pattern of an IaaS architecture, according to at least one embodiment. Service operators 1202 (e.g. service operators 1002 of FIG. 10) can be communicatively coupled to a secure host tenancy 1204 (e.g. the secure host tenancy 1004 of FIG. 10) that can include a virtual cloud network (VCN) 1206 (e.g. the VCN 1006 of FIG. 10) and a secure host subnet 1208 (e.g. the secure host subnet 1008 of FIG. 10). The VCN 1206 can include an LPG 1210 (e.g. the LPG 1010 of FIG. 10) that can be communicatively coupled to an SSH VCN 1212 (e.g. the SSH VCN 1012 of FIG. 10) via an LPG 1210 contained in the SSH VCN 1212. The SSH VCN 1212 can include an SSH subnet 1214 (e.g. the SSH subnet 1014 of FIG. 10), and the SSH VCN 1212 can be communicatively coupled to a control plane VCN 1216 (e.g. the control plane VCN 1016 of FIG. 10) via an LPG 1210 contained in the control plane VCN 1216 and to a data plane VCN 1218 (e.g. the data plane 1018 of FIG. 10) via an LPG 1210 contained in the data plane VCN 1218. The control plane VCN 1216 and the data plane VCN 1218 can be contained in a service tenancy 1219 (e.g. the service tenancy 1019 of FIG. 10).

The control plane VCN 1216 can include a control plane DMZ tier 1220 (e.g. the control plane DMZ tier 1020 of FIG. 10) that can include load balancer (LB) subnet(s) 1222 (e.g. LB subnet(s) 1022 of FIG. 10), a control plane app tier 1224 (e.g. the control plane app tier 1024 of FIG. 10) that can include app subnet(s) 1226 (e.g. similar to app subnet(s) 1026 of FIG. 10), a control plane data tier 1228 (e.g. the control plane data tier 1028 of FIG. 10) that can include DB subnet(s) 1230. The LB subnet(s) 1222 contained in the control plane DMZ tier 1220 can be communicatively coupled to the app subnet(s) 1226 contained in the control plane app tier 1224 and to an Internet gateway 1234 (e.g. the Internet gateway 1034 of FIG. 10) that can be contained in the control plane VCN 1216, and the app subnet(s) 1226 can be communicatively coupled to the DB subnet(s) 1230 contained in the control plane data tier 1228 and to a service gateway 1236 (e.g. the service gateway of FIG. 10) and a network address translation (NAT) gateway 1238 (e.g. the NAT gateway 1038 of FIG. 10). The control plane VCN 1216 can include the service gateway 1236 and the NAT gateway 1238.

The data plane VCN 1218 can include a data plane app tier 1246 (e.g. the data plane app tier 1046 of FIG. 10), a data plane DMZ tier 1248 (e.g. the data plane DMZ tier 1048 of FIG. 10), and a data plane data tier 1250 (e.g. the data plane data tier 1050 of FIG. 10). The data plane DMZ tier 1248 can include LB subnet(s) 1222 that can be communicatively coupled to trusted app subnet(s) 1260 and untrusted app subnet(s) 1262 of the data plane app tier 1246 and the Internet gateway 1234 contained in the data plane VCN 1218. The trusted app subnet(s) 1260 can be communicatively coupled to the service gateway 1236 contained in the data plane VCN 1218, the NAT gateway 1238 contained in the data plane VCN 1218, and DB subnet(s) 1230 contained in the data plane data tier 1250. The untrusted app subnet(s) 1262 can be communicatively coupled to the service gateway 1236 contained in the data plane VCN 1218 and DB subnet(s) 1230 contained in the data plane data tier 1250. The data plane data tier 1250 can include DB subnet(s) 1230 that can be communicatively coupled to the service gateway 1236 contained in the data plane VCN 1218.

The untrusted app subnet(s) 1262 can include one or more primary VNICs 1264(1)-(N) that can be communicatively coupled to tenant virtual machines (VMs) 1266(1)-(N). Each tenant VM 1266(1)-(N) can be communicatively coupled to a respective app subnet 1267(1)-(N) that can be contained in respective container egress VCNs 1268(1)-(N) that can be contained in respective customer tenancies 1270(1)-(N). Respective secondary VNICs 1272(1)-(N) can facilitate communication between the untrusted app subnet(s) 1262 contained in the data plane VCN 1218 and the app subnet contained in the container egress VCNs 1268(1)-(N). Each container egress VCNs 1268(1)-(N) can include a NAT gateway 1238 that can be communicatively coupled to public Internet 1254 (e.g. public Internet 1054 of FIG. 10).

The Internet gateway 1234 contained in the control plane VCN 1216 and contained in the data plane VCN 1218 can be communicatively coupled to a metadata management service 1252 (e.g. the metadata management system 1052 of FIG. 10) that can be communicatively coupled to public Internet 1254. Public Internet 1254 can be communicatively coupled to the NAT gateway 1238 contained in the control plane VCN 1216 and contained in the data plane VCN 1218. The service gateway 1236 contained in the control plane VCN 1216 and contained in the data plane VCN 1218 can be communicatively couple to cloud services 1256.

In some embodiments, the data plane VCN 1218 can be integrated with customer tenancies 1270. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1246. Code to run the function may be executed in the VMs 1266(1)-(N), and the code may not be configured to run anywhere else on the data plane VCN 1218. Each VM 1266(1)-(N) may be connected to one customer tenancy 1270. Respective containers 1271(1)-(N) contained in the VMs 1266(1)-(N) may be configured to run the code. In this case, there can be a dual isolation (e.g., the containers 1271(1)-(N) running code, where the containers 1271(1)-(N) may be contained in at least the VM 1266(1)-(N) that are contained in the untrusted app subnet(s) 1262), which may help prevent incorrect or otherwise undesirable code from damaging the network of the IaaS provider or from damaging a network of a different customer. The containers 1271(1)-(N) may be communicatively coupled to the customer tenancy 1270 and may be configured to transmit or receive data from the customer tenancy 1270. The containers 1271(1)-(N) may not be configured to transmit or receive data from any other entity in the data plane VCN 1218. Upon completion of running the code, the IaaS provider may kill or otherwise dispose of the containers 1271(1)-(N).

In some embodiments, the trusted app subnet(s) 1260 may run code that may be owned or operated by the IaaS provider. In this embodiment, the trusted app subnet(s) 1260 may be communicatively coupled to the DB subnet(s) 1230 and be configured to execute CRUD operations in the DB subnet(s) 1230. The untrusted app subnet(s) 1262 may be communicatively coupled to the DB subnet(s) 1230, but in this embodiment, the untrusted app subnet(s) may be configured to execute read operations in the DB subnet(s) 1230. The containers 1271(1)-(N) that can be contained in the VM 1266(1)-(N) of each customer and that may run code from the customer may not be communicatively coupled with the DB subnet(s) 1230.

In other embodiments, the control plane VCN 1216 and the data plane VCN 1218 may not be directly communicatively coupled. In this embodiment, there may be no direct communication between the control plane VCN 1216 and the data plane VCN 1218. However, communication can occur indirectly through at least one method. An LPG 1210 may be established by the IaaS provider that can facilitate communication between the control plane VCN 1216 and the data plane VCN 1218. In another example, the control plane VCN 1216 or the data plane VCN 1218 can make a call to cloud services 1256 via the service gateway 1236. For example, a call to cloud services 1256 from the control plane VCN 1216 can include a request for a service that can communicate with the data plane VCN 1218.

Figure 13:
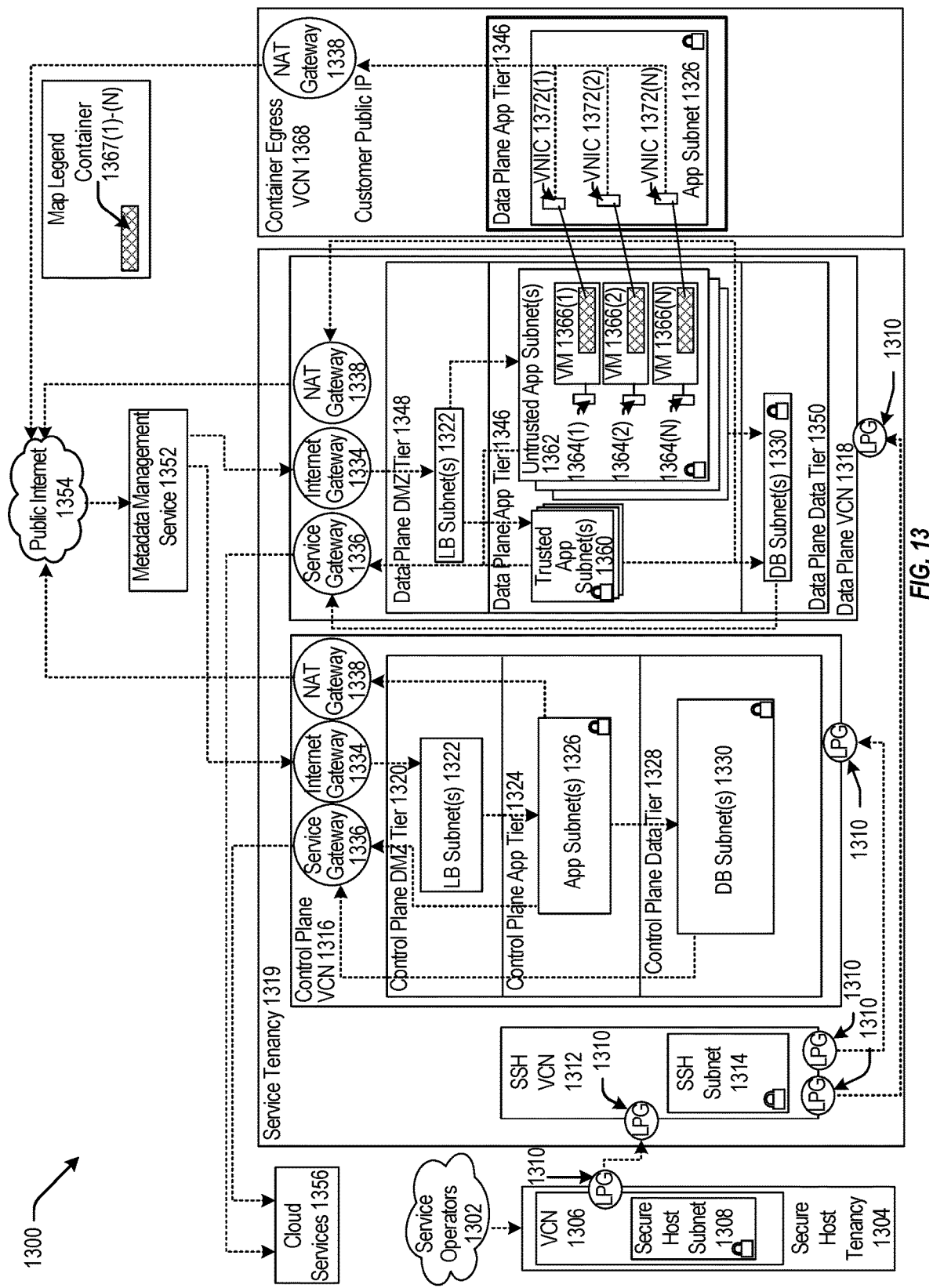
FIG. 13 is a block diagram illustrating another pattern for implementing a cloud infrastructure as a service system, according to at least one embodiment.

FIG. 13 is a block diagram 1300 illustrating another example pattern of an IaaS architecture, according to at least one embodiment. Service operators 1302 (e.g. service operators 1002 of FIG. 10) can be communicatively coupled to a secure host tenancy 1304 (e.g. the secure host tenancy 1004 of FIG. 10) that can include a virtual cloud network (VCN) 1306 (e.g. the VCN 1006 of FIG. 10) and a secure host subnet 1308 (e.g. the secure host subnet 1008 of FIG. 10). The VCN 1306 can include an LPG 1310 (e.g. the LPG 1010 of FIG. 10) that can be communicatively coupled to an SSH VCN 1312 (e.g. the SSH VCN 1012 of FIG. 10) via an LPG 1310 contained in the SSH VCN 1312. The SSH VCN 1312 can include an SSH subnet 1314 (e.g. the SSH subnet 1014 of FIG. 10), and the SSH VCN 1312 can be communicatively coupled to a control plane VCN 1316 (e.g. the control plane VCN 1016 of FIG. 10) via an LPG 1310 contained in the control plane VCN 1316 and to a data plane VCN 1318 (e.g. the data plane 1018 of FIG. 10) via an LPG 1310 contained in the data plane VCN 1318. The control plane VCN 1316 and the data plane VCN 1318 can be contained in a service tenancy 1319 (e.g. the service tenancy 1019 of FIG. 10).

The control plane VCN 1316 can include a control plane DMZ tier 1320 (e.g. the control plane DMZ tier 1020 of FIG. 10) that can include LB subnet(s) 1322 (e.g. LB subnet(s) 1022 of FIG. 10), a control plane app tier 1324 (e.g. the control plane app tier 1024 of FIG. 10) that can include app subnet(s) 1326 (e.g. app subnet(s) 1026 of FIG. 10), a control plane data tier 1328 (e.g. the control plane data tier 1028 of FIG. 10) that can include DB subnet(s) 1330 (e.g. DB subnet(s) 1230 of FIG. 12). The LB subnet(s) 1322 contained in the control plane DMZ tier 1320 can be communicatively coupled to the app subnet(s) 1326 contained in the control plane app tier 1324 and to an Internet gateway 1334 (e.g. the Internet gateway 1034 of FIG. 10) that can be contained in the control plane VCN 1316, and the app subnet(s) 1326 can be communicatively coupled to the DB subnet(s) 1330 contained in the control plane data tier 1328 and to a service gateway 1336 (e.g. the service gateway of FIG. 10) and a network address translation (NAT) gateway 1338 (e.g. the NAT gateway 1038 of FIG. 10). The control plane VCN 1316 can include the service gateway 1336 and the NAT gateway 1338.

The data plane VCN 1318 can include a data plane app tier 1346 (e.g. the data plane app tier 1046 of FIG. 10), a data plane DMZ tier 1348 (e.g. the data plane DMZ tier 1048 of FIG. 10), and a data plane data tier 1350 (e.g. the data plane data tier 1050 of FIG. 10). The data plane DMZ tier 1348 can include LB subnet(s) 1322 that can be communicatively coupled to trusted app subnet(s) 1360 (e.g. trusted app subnet(s) 1260 of FIG. 12) and untrusted app subnet(s) 1362 (e.g. untrusted app subnet(s) 1262 of FIG. 12) of the data plane app tier 1346 and the Internet gateway 1334 contained in the data plane VCN 1318. The trusted app subnet(s) 1360 can be communicatively coupled to the service gateway 1336 contained in the data plane VCN 1318, the NAT gateway 1338 contained in the data plane VCN 1318, and DB subnet(s) 1330 contained in the data plane data tier 1350. The untrusted app subnet(s) 1362 can be communicatively coupled to the service gateway 1336 contained in the data plane VCN 1318 and DB subnet(s) 1330 contained in the data plane data tier 1350. The data plane data tier 1350 can include DB subnet(s) 1330 that can be communicatively coupled to the service gateway 1336 contained in the data plane VCN 1318.

The untrusted app subnet(s) 1362 can include primary VNICs 1364(1)-(N) that can be communicatively coupled to tenant virtual machines (VMs) 1366(1)-(N) residing within the untrusted app subnet(s) 1362. Each tenant VM 1366(1)-(N) can run code in a respective container 1367(1)-(N), and be communicatively coupled to an app subnet 1326 that can be contained in a data plane app tier 1346 that can be contained in a container egress VCN 1368. Respective secondary VNICs 1372(1)-(N) can facilitate communication between the untrusted app subnet(s) 1362 contained in the data plane VCN 1318 and the app subnet contained in the container egress VCN 1368. The container egress VCN can include a NAT gateway 1338 that can be communicatively coupled to public Internet 1354 (e.g. public Internet 1054 of FIG. 10).

The Internet gateway 1334 contained in the control plane VCN 1316 and contained in the data plane VCN 1318 can be communicatively coupled to a metadata management service 1352 (e.g. the metadata management system 1052 of FIG. 10) that can be communicatively coupled to public Internet 1354. Public Internet 1354 can be communicatively coupled to the NAT gateway 1338 contained in the control plane VCN 1316 and contained in the data plane VCN 1318. The service gateway 1336 contained in the control plane VCN 1316 and contained in the data plane VCN 1318 can be communicatively couple to cloud services 1356.

In some examples, the pattern illustrated by the architecture of block diagram 1300 of FIG. 13 may be considered an exception to the pattern illustrated by the architecture of block diagram 1200 of FIG. 12 and may be desirable for a customer of the IaaS provider if the IaaS provider cannot directly communicate with the customer (e.g., a disconnected region). The respective containers 1367(1)-(N) that are contained in the VMs 1366(1)-(N) for each customer can be accessed in real-time by the customer. The containers 1367(1)-(N) may be configured to make calls to respective secondary VNICs 1372(1)-(N) contained in app subnet(s) 1326 of the data plane app tier 1346 that can be contained in the container egress VCN 1368. The secondary VNICs 1372(1)-(N) can transmit the calls to the NAT gateway 1338 that may transmit the calls to public Internet 1354. In this example, the containers 1367(1)-(N) that can be accessed in real-time by the customer can be isolated from the control plane VCN 1316 and can be isolated from other entities contained in the data plane VCN 1318. The containers 1367(1)-(N) may also be isolated from resources from other customers.

In other examples, the customer can use the containers 1367(1)-(N) to call cloud services 1356. In this example, the customer may run code in the containers 1367(1)-(N) that requests a service from cloud services 1356. The containers 1367(1)-(N) can transmit this request to the secondary VNICs 1372(1)-(N) that can transmit the request to the NAT gateway that can transmit the request to public Internet 1354. Public Internet 1354 can transmit the request to LB subnet(s) 1322 contained in the control plane VCN 1316 via the Internet gateway 1334. In response to determining the request is valid, the LB subnet(s) can transmit the request to app subnet(s) 1326 that can transmit the request to cloud services 1356 via the service gateway 1336.

It should be appreciated that IaaS architectures 1000, 1100, 1200, 1300 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 14:
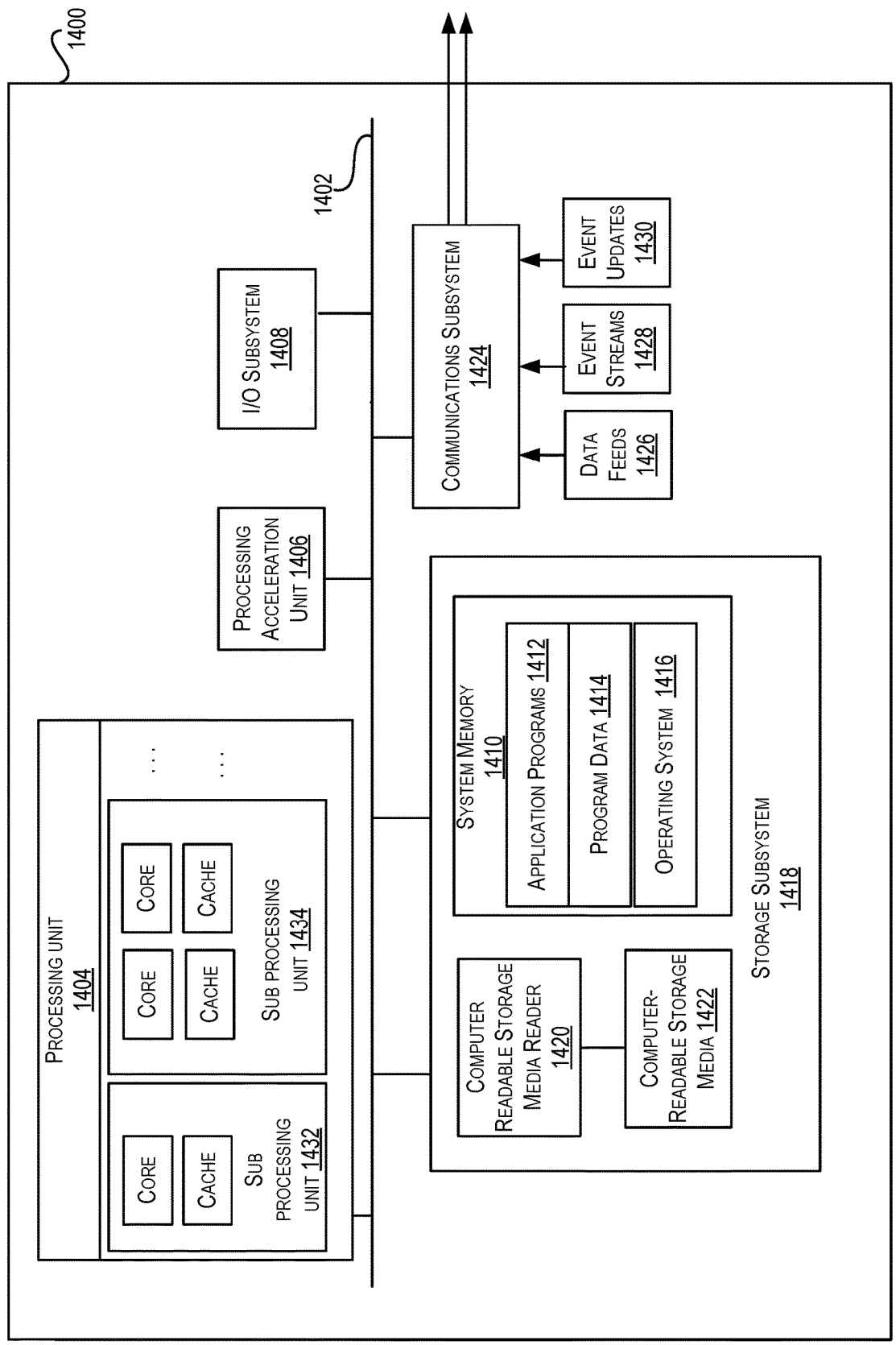
FIG. 14 is a block diagram illustrating an example computer system, according to at least one embodiment.

FIG. 14 illustrates an example computer system 1400, in which various embodiments of the present disclosure may be implemented. The system 1400 may be used to implement any of the computer systems described above. As shown in the figure, computer system 1400 includes a processing unit 1404 that communicates with a number of peripheral subsystems via a bus subsystem 1402. These peripheral subsystems may include a processing acceleration unit 1406, an I/O subsystem 1408, a storage subsystem 1418 and a communications subsystem 1424. Storage subsystem 1418 includes tangible computer-readable storage media 1422 and a system memory 1410.

Bus subsystem 1402 provides a mechanism for letting the various components and subsystems of computer system 1400 communicate with each other as intended. Although bus subsystem 1402 is shown schematically as a single bus, alternative embodiments of the bus subsystem may utilize multiple buses. Bus subsystem 1402 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1404, which can be implemented as one or more integrated circuits (e.g., a conventional microprocessor or microcontroller), controls the operation of computer system 1400. One or more processors may be included in processing unit 1404. These processors may include single core or multicore processors. In certain embodiments, processing unit 1404 may be implemented as one or more independent processing units 1432 and/or 1434 with single or multicore processors included in each processing unit. In other embodiments, processing unit 1404 may also be implemented as a quad-core processing unit formed by integrating two dual-core processors into a single chip.

In various embodiments, processing unit 1404 can execute a variety of programs in response to program code and can maintain multiple concurrently executing programs or processes. At any given time, some or all of the program code to be executed can be resident in processor(s) 1404 and/or in storage subsystem 1418. Through suitable programming, processor(s) 1404 can provide various functionalities described above. Computer system 1400 may additionally include a processing acceleration unit 1406, which can include a digital signal processor (DSP), a special-purpose processor, and/or the like.

I/O subsystem 1408 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1400 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1400 may comprise a storage subsystem 1418 that comprises software elements, shown as being currently located within a system memory 1410. System memory 1410 may store program instructions that are loadable and executable on processing unit 1404, as well as data generated during the execution of these programs.

Depending on the configuration and type of computer system 1400, system memory 1410 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1404. In some implementations, system memory 1410 may include multiple different types of memory, such as static random access memory (SRAM) or dynamic random access memory (DRAM). In some implementations, a basic input/output system (BIOS), containing the basic routines that help to transfer information between elements within computer system 1400, such as during start-up, may typically be stored in the ROM. By way of example, and not limitation, system memory 1410 also illustrates application programs 1412, which may include client applications, Web browsers, mid-tier applications, relational database management systems (RDBMS), etc., program data 1414, and an operating system 1416. By way of example, operating system 1416 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 14 OS, and Palm® OS operating systems.

Storage subsystem 1418 may also provide a tangible computer-readable storage medium for storing the basic programming and data constructs that provide the functionality of some embodiments. Software (programs, code modules, instructions) that when executed by a processor provide the functionality described above may be stored in storage subsystem 1418. These software modules or instructions may be executed by processing unit 1404. Storage subsystem 1418 may also provide a repository for storing data used in accordance with the present disclosure.

Storage subsystem 1400 may also include a computer-readable storage media reader 1420 that can further be connected to computer-readable storage media 1422. Together and, optionally, in combination with system memory 1410, computer-readable storage media 1422 may comprehensively represent remote, local, fixed, and/or removable storage devices plus storage media for temporarily and/or more permanently containing, storing, transmitting, and retrieving computer-readable information.

Computer-readable storage media 1422 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1400.

By way of example, computer-readable storage media 1422 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1422 may include, but is not limited to, Zip® drives, flash memory cards, universal serial bus (USB) flash drives, secure digital (SD) cards, DVD disks, digital video tape, and the like. Computer-readable storage media 1422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1400.

Communications subsystem 1424 provides an interface to other computer systems and networks. Communications subsystem 1424 serves as an interface for receiving data from and transmitting data to other systems from computer system 1400. For example, communications subsystem 1424 may enable computer system 1400 to connect to one or more devices via the Internet. In some embodiments communications subsystem 1424 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1424 can provide wired network connectivity (e.g., Ethernet) in addition to or instead of a wireless interface.

In some embodiments, communications subsystem 1424 may also receive input communication in the form of structured and/or unstructured data feeds 1426, event streams 1428, event updates 1430, and the like on behalf of one or more users who may use computer system 1400.

By way of example, communications subsystem 1424 may be configured to receive data feeds 1426 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1424 may also be configured to receive data in the form of continuous data streams, which may include event streams 1428 of real-time events and/or event updates 1430, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1424 may also be configured to output the structured and/or unstructured data feeds 1426, event streams 1428, event updates 1430, and the like to one or more databases that may be in communication with one or more streaming data source computers coupled to computer system 1400.

Computer system 1400 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1400 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X Y, or Z," unless specifically stated otherwise, is intended to be understood within the context as used in general to present that an item, term, etc., may be either X Y, or Z, or any combination thereof (e.g., X, Y, and/or Z). Thus, such disjunctive language is not generally intended to, and should not, imply that certain embodiments require at least one of X at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
   receiving, by virtual machine instance in a private tenancy of a first virtual cloud network, a command to execute an operation on a cloud resource of the virtual cloud network, the command being received from a router via a primary virtual network interface card (vNIC) configured to restrict outgoing traffic from the virtual machine instance;
   executing, by the virtual machine instance, the operation on the cloud resource;
   generating, by the virtual machine instance, an output of the execution of the operation on the cloud resource; and
   transmitting, by the virtual machine instance, a message comprising the output of the execution of the operation to a computing device on a public network different from the virtual cloud network via a secondary virtual network interface card, the secondary virtual network interface card being configured to restrict all incoming traffic to the virtual machine instance,
   wherein the secondary virtual network interface card is configured to transmit the output of the operation to the computing device on the public network outside of the virtual cloud network via a network gateway.

2. The method of claim 1, wherein the operation is requested by a user of a user device, and the generating the output of the operation comprises:
   generating a return message for the user device; and
   transmitting the return message to the router via the primary virtual network interface card, wherein the primary virtual network interface card is configured to:
   accept the return message for the user device; and
   reject the message comprising the output of the execution of the operation.

3. The method of claim 1 wherein the router is in a second virtual cloud network, the second virtual cloud network being different from the first virtual cloud network but also implemented in the private tenancy.

4. The method of claim 1 wherein the network gateway is in a third virtual cloud network, the third virtual cloud network being different from the first virtual cloud network and being implemented outside the private tenancy.

5. The method of claim 4, wherein:
   the private tenancy is associated with a first block of IP addresses attributable to network traffic from the private tenancy;
   a second tenancy outside of the private tenancy is associated with a second block of IP addresses, the second block of IP addresses being different from the first block of IP addresses; and
   the second block of IP addresses being attributable to network traffic from one or more users of the virtual machine instance.

6. The method of claim 1, wherein the network gateway comprises a network address translation (NAT) gateway, being configured to transmit messages using an IP address of a block of IP addresses attributable to network traffic from one or more users of the virtual machine instance.

7. A computer system, comprising:
   one or more processors;
   a memory in communication with the one or more processors, the memory configured to store computer-executable instructions, wherein executing the computer-executable instructions causes the one or more processors to perform steps comprising:
   receiving, by a virtual machine instance in a private tenancy of a first virtual cloud network, a command to execute an operation on a cloud resource of the virtual cloud network, the command being received from a router via a primary virtual network interface card (vNIC) configured to restrict outgoing traffic from the virtual machine instance;
   executing, by the virtual machine instance, the operation on the cloud resource;
   generating, by the virtual machine instance, an output of the execution of the operation on the cloud resource; and
   transmitting, by the virtual machine instance, a message comprising the output of the execution of the operation to a shell subnet computing device on a public network different from the virtual cloud network via a secondary virtual network interface card, the secondary virtual network interface card being configured to restrict all incoming traffic to the virtual machine instance,
   wherein the secondary virtual network interface card is configured to transmit the output of the operation to the computing device on the public network outside of the virtual cloud network via a network gateway.

8. The system of claim 7, wherein the operation is requested by a user of a user device, and the generating the output of the operation comprises:
   generating a return message for the user device; and
   transmitting the return message to the router via the primary virtual network interface card, wherein the primary virtual network interface card is configured to:
   accept the return message for the user device; and reject the message comprising the output of the execution of the operation.

9. The system of claim 7, wherein the router is in a second virtual cloud network, the second virtual cloud network being different from the first virtual cloud network but also implemented in the private tenancy.

10. The system of claim 7, wherein the network gateway is in a third virtual cloud network, the third virtual cloud network being different from the first virtual cloud network and being implemented outside the private tenancy.

11. The system of claim 10, wherein:
the private tenancy is associated with a first block of IP addresses attributable to network traffic from the private tenancy;
a second tenancy outside of the private tenancy is associated with a second block of IP addresses, the second block of IP addresses being different from the first block of IP addresses; and
the second block of IP addresses being attributable to network traffic from one or more users of the virtual machine instance.

12. The system of claim 7, wherein the network gateway comprises a network address translation (NAT) gateway, being configured to transmit messages using an IP address of a block of IP addresses attributable to network traffic from one or more users of the virtual machine instance.

13. A non-transitory computer-readable storage medium, storing computer-executable instructions that, when executed, cause one or more processors of a computer system to perform steps comprising:
receiving, by a virtual machine instance in a private tenancy of a first virtual cloud network, a command to execute an operation on a cloud resource of the virtual cloud network, the command being received from a router via a primary virtual network interface card (vNIC) configured to restrict outgoing traffic from the virtual machine instance;
executing, by the virtual machine instance, the operation on the cloud resource;
generating, by the virtual machine instance, an output of the execution of the operation on the cloud resource; and
transmitting, by the virtual machine instance, a message comprising the output of the execution of the operation to a shell subnet computing device on a public network different from the virtual cloud network via a secondary virtual network interface card, the secondary virtual network interface card being configured to restrict all incoming traffic to the virtual machine instance,
wherein the secondary virtual network interface card is configured to transmit the output of the operation to the computing device on the public network outside of the virtual cloud network via a network gateway.

14. The non-transitory computer-readable storage medium of claim 13, wherein the operation is requested by a user of a user device, and the generating the output of the operation comprises:
generating a return message for the user device; and
transmitting the return message to the router via the primary virtual network interface card, wherein the primary virtual network interface card is configured to:
accept the return message for the user device; and
reject the message comprising the output of the execution of the operation.

15. The non-transitory computer-readable storage medium of claim 13, wherein the router is in a second virtual cloud network, the second virtual cloud network being different from the first virtual cloud network but also implemented in the private tenancy.

16. The non-transitory computer-readable storage medium of claim 13, wherein the network gateway is in a third virtual cloud network, the third virtual cloud network being different from the first virtual cloud network and being implemented outside the private tenancy.

17. The non-transitory computer-readable storage medium of claim 16, wherein:
the private tenancy is associated with a first block of IP addresses attributable to network traffic from the private tenancy;
a second tenancy outside of the private tenancy is associated with a second block of IP addresses, the second block of IP addresses being different from the first block of IP addresses; and
the second block of IP addresses being attributable to network traffic from one or more users of the virtual machine instance.

\* \* \* \* \*

UNITED STATES PATENT AND TRADEMARK OFFICE
CERTIFICATE OF CORRECTION

| | |
|---|---|
| PATENT NO. | : 11,374,792 B2 |
| APPLICATION NO. | : 16/993973 |
| DATED | : June 28, 2022 |
| INVENTOR(S) | : Kasso et al. |

It is certified that error appears in the above-identified patent and that said Letters Patent is hereby corrected as shown below:

In the Drawings

On sheet 5 of 14, in FIG. 5, under Reference Numeral 516, Line 4, delete "seconday" and insert -- secondary --, therefor.

In the Specification

In Column 14, Lines 64-65, delete "FIG. 2)" and insert -- FIG. 2). --, therefor.

In Column 16, Line 24, delete "like." and insert -- like). --, therefor.

In Column 30, Line 65, delete "X" and insert -- X, --, therefor.

In Column 31, Line 1, delete "X" and insert -- X, --, therefor.

In Column 31, Line 5, delete "X" and insert -- X, --, therefor.

In the Claims

In Column 31, Line 38, in Claim 1, delete "by" and insert -- by a --, therefor.

In Column 32, Line 4, in Claim 3, delete "claim 1" and insert -- claim 1, --, therefor.

In Column 32, Line 8, in Claim 4, delete "claim 1" and insert -- claim 1, --, therefor.

In Column 32, Line 50, in Claim 7, delete "shell subnet computing" and insert -- computing --, therefor.

In Column 33, Line 45, in Claim 13, delete "shell subnet computing" and insert -- computing --, therefor.

Signed and Sealed this
Thirteenth Day of December, 2022

Katherine Kelly Vidal
*Director of the United States Patent and Trademark Office*